United States Patent
Fuji et al.

(10) Patent No.: US 8,445,624 B2
(45) Date of Patent: *May 21, 2013

(54) PROCESSES FOR PRODUCING POLYCARBONATE

(75) Inventors: Michiaki Fuji, Yokkaichi (JP); Shingo Namiki, Yokkaichi (JP); Masaki Yamamoto, Kitakyushu (JP)

(73) Assignee: Mitsubishi Chemical Corporation, Tokyo (JP)

(*) Notice: Subject to any disclaimer, the term of this patent is extended or adjusted under 35 U.S.C. 154(b) by 102 days.

This patent is subject to a terminal disclaimer.

(21) Appl. No.: 12/808,058

(22) PCT Filed: Dec. 10, 2008

(86) PCT No.: PCT/JP2008/072455
§ 371 (c)(1),
(2), (4) Date: Sep. 24, 2010

(87) PCT Pub. No.: WO2009/075305
PCT Pub. Date: Jun. 18, 2009

(65) Prior Publication Data
US 2011/0034646 A1 Feb. 10, 2011

(30) Foreign Application Priority Data

Dec. 13, 2007 (JP) ................. 2007-322490
Dec. 13, 2007 (JP) ................. 2007-322491

(51) Int. Cl.
*C08G 64/00* (2006.01)
*C08G 63/02* (2006.01)

(52) U.S. Cl.
USPC ........... 528/196; 428/35.7; 528/370; 528/371

(58) Field of Classification Search
USPC ................... 428/35.7; 528/370, 371
See application file for complete search history.

(56) References Cited

U.S. PATENT DOCUMENTS

| 4,506,066 | A | 3/1985 | Medem et al. |
| 5,858,499 | A | 1/1999 | Abe et al. |
| 2010/0190953 | A1 | 7/2010 | Fuji et al. |
| 2011/0003101 | A1* | 1/2011 | Fuji et al. .............. 428/35.7 |

FOREIGN PATENT DOCUMENTS

| GB | 1 079 686 | 8/1967 |
| JP | 56 55425 | 5/1981 |
| JP | 63 12896 | 3/1988 |
| JP | 6 145336 | 5/1994 |
| JP | 9 268225 | 10/1997 |
| JP | 10 101787 | 4/1998 |
| JP | 10 330474 | 12/1998 |
| WO | 2004 111106 | 12/2004 |
| WO | 2007 013463 | 2/2007 |
| WO | 2007 148604 | 12/2007 |
| WO | 2008 029746 | 3/2008 |

OTHER PUBLICATIONS

Office Action issued on Dec. 16, 2011 in the corresponding Chinese Patent Application No. 200880119869.0 (with English Translation).
Office Action issued Jun. 12, 2012, in Chinese Patent Application No. 200880119869.0 with English-language translation.
U.S. Appl. No. 12/747,724, filed Jun. 11, 2010, Fuji, et al.
U.S. Appl. No. 12/808,058, filed Jun. 14, 2010, Fuji, et al.
Office Action issued Oct. 19, 2012 in Korean Patent Application No. 2010-7012338 with English Language translation.
Office Action issued Feb. 5, 2013, in CN application No. 200880119869.0 with English translation.
Korean Office Action issued Mar. 14, 2012, in Patent Application No. 10-2010-7012338 (with English-language translation).

* cited by examiner

*Primary Examiner* — Terressa Boykin
(74) *Attorney, Agent, or Firm* — Oblon, Spivak, McClelland, Maier & Neustadt, L.L.P.

(57) ABSTRACT

A subject for the invention is to provide a polycarbonate having excellent mechanical strength, heat resistance, a low refractive index, a large Abbe number, reduced birefringence, and excellent transparency. The invention relates to a polycarbonate characterized by being obtained by subjecting one or more dihydroxy compounds including a dihydroxy compound having at least one linking group —$CH_2$—O— in the molecule thereof to melt polycondensation with a carbonic acid diester, and by having a reduced viscosity of from 0.40 dL/g to 1.70 dL/g and a formic acid content lower than 5 ppm by weight.

36 Claims, 2 Drawing Sheets

PROCESSES FOR PRODUCING POLYCARBONATE

TECHNICAL FIELD

The present invention relates to a polycarbonate which contains constituent units capable of being derived from glucides, e.g., starches, as biomass resources and which has excellent heat resistance, moldability, and mechanical strength and has excellent optical properties including a low refractive index and a large Abbe number. The invention further relates to processes for producing the polycarbonate and to a molded article formed from the polycarbonate or a composition thereof.

BACKGROUND ART

Polycarbonates are generally produced using bisphenols as monomer ingredients, and are in extensive use as engineering plastics in applications such as electrical/electronic parts and automotive parts and in the optical field including optical recording media and lenses, so as to take advantage of the superiority thereof in transparency, heat resistance, mechanical strength, etc. However, for application to optical compensation films for flat panel displays and the like, which are rapidly spreading recently, a higher degree of optical properties including low birefringence and a low photoelastic coefficient have come to be required. The existing aromatic polycarbonates have become unable to meet the requirement.

Conventional polycarbonates are generally produced from raw materials induced from oil resources. In recent years, however, there is a fear about the depletion of oil resources, and polycarbonates produced from raw materials obtained from biomass resources such as plants are desired to be supplied. In addition, since there also is a fear that global warming caused by an increase in carbon dioxide emission and accumulation thereof may bring about climate changes, there is a desire for the development of a polycarbonate which is produced using a plant-derived monomer as a starting material and is carbon-neutral even when discarded after being used.

A method in which isosorbide, which has a heterocyclic structure, is used as a plant-derived monomer to obtain a polycarbonate through transesterification with diphenyl carbonate has hitherto been proposed (see, for example, patent document 1). As a copolycarbonate produced from isosorbide and another dihydroxy compound, a polycarbonate obtained through copolymerization with bisphenol A has been proposed (see, for example, patent document 2). Furthermore, an attempt has been made to improve the stiffness characteristics of the homo-polycarbonate produced from isosorbide, by copolymerizing isosorbide and an aliphatic diol (see, for example, patent document 3).

On the other hand, many proposals have been made on polycarbonates obtained by polymerizing 1,4-cyclohexanedimethanol, which is an alicyclic dihydroxy compound (see, for example, patent documents 4 and 5). However, these polycarbonates have a molecular weight as low as about 4,000 at the most and, hence, many of these have a low glass transition temperature.

Polycarbonates produced from monomers having a heterocyclic structure, e.g., isosorbide, have high transparency, excellent heat resistance, a low refractive index, and a small Abbe number, and applications thereof are hence expected to spread to optical compensation films and the like. However, polycarbonates having such a structure are inferior in reactivity on one hand and have poor thermal stability on the other hand, as compared with the conventional aromatic polycarbonates including a bisphenol structure. When such a polycarbonate having a molecular weight required of molding materials is to be obtained by conventional production processes, performances such as color tone and transparency should be sacrificed. Furthermore, there has been a problem that thermal deterioration occurs during polymerization reaction to generate by-products including formic acid and this formic acid remains in the polymer and volatilizes during molding to arouse various troubles including corrosion of the mold and rolls.

Patent Document 1: British Patent No. 1079686, description

Patent Document 2: JP-A-56-55425

Patent Document 3: International Publication No. 2004/111106, pamphlet

Patent Document 4: JP-A-6-145336

Patent Document 5: JP-B-63-12896

DISCLOSURE OF THE INVENTION

Problems that the Invention is to Solve

The polycarbonates described in patent documents 1 to 5 are insufficient in heat resistance, transparency, thermal stability, and color tone as compared with conventional aromatic polycarbonates derived from petroleum feedstocks, and it has been difficult to use those polycarbonates as optical materials or molding materials. It is therefore desired to develop a polycarbonate having a low refractive index, a small Abbe number, and excellent thermal stability and color tone while retaining the high heat resistance and transparency of aromatic polycarbonates. There also is a desire for a process for producing a polycarbonate without impairing such quality of the polycarbonate.

An object of the invention is to eliminate the conventional problems and provide a polycarbonate which has excellent mechanical strength, heat resistance, a low refractive index, a large Abbe number, and reduced birefringence and has excellent transparency, color tone, thermal stability, and molding stability. Other objects are to provide processes for producing the polycarbonate and to provide a molded article formed from the polycarbonate or a composition thereof.

Means for Solving the Problems

The present inventors diligently made investigations in order to overcome the problems. As a result, they have found a polycarbonate which has excellent mechanical strength, heat resistance, a low refractive index, a large Abbe number, reduced birefringence, and excellent transparency, thermal stability, and color tone. The inventors have further found processes for producing the polycarbonate. Namely, essential points of the invention reside in the following [1] to [20].

[1] A process for producing a polycarbonate which comprises subjecting one or more dihydroxy compounds comprising a dihydroxy compound having at least one linking group —$CH_2$—O— in the molecule thereof to melt polycondensation with a carbonic acid diester using at least two serially arranged reactors to produce a polycarbonate, characterized in that in at least one of the reactors, the difference between the temperature of a polymer and the temperature of a heating medium is regulated to 80° C. or smaller when the polycarbonate yielded has a reduced viscosity of 0.10 dL/g or lower, or to 60° C. or smaller when the polycarbonate yielded has a reduced viscosity exceeding 0.10 dL/g but not higher than 0.40 dL/g, or to 40° C. or smaller when the polycarbonate yielded has a reduced viscosity exceeding 0.40 dL/g.

[2] The process according to [1], wherein in the first-stage reactor, the difference between the polymer temperature and the temperature of the heating medium is regulated to 80° C. or smaller when the polycarbonate yielded has a reduced viscosity of 0.10 dL/g or lower, or to 60° C. or smaller when the polycarbonate yielded has a reduced viscosity exceeding 0.10 dL/g but not higher than 0.40 dL/g, or to 40° C. or smaller when the polycarbonate yielded has a reduced viscosity exceeding 0.40 dL/g.

[3] The process according to [1] or [2], wherein in the final-stage reactor, the difference between the polymer temperature and the temperature of the heating medium is regulated to 60° C. or smaller when the polycarbonate yielded has a reduced viscosity of 0.30 dL/g or lower, or to 50° C. or smaller when the polycarbonate yielded has a reduced viscosity exceeding 0.30 dL/g but not higher than 0.40 dL/g, or to 40° C. or smaller when the polycarbonate yielded has a reduced viscosity exceeding 0.40 dL/g.

[4] A process for producing a polycarbonate by subjecting one or more dihydroxy compounds comprising a dihydroxy compound having at least one linking group —CH$_2$—O— in the molecule thereof to melt polycondensation with a carbonic acid diester with heating with a heating medium, characterized by comprising
a first-stage polycondensation step in which a mixture of the dihydroxy compounds and the carbonic acid diester is fed in a molten state to a vertical reactor equipped with a vertical rotating shaft and a stirring blade attached to the vertical rotating shaft, and a polycondensation reaction is conducted at a temperature of 150° C. to 270° C. to obtain a polycarbonate having a reduced viscosity of 0.03-0.40 dL/g and
a second-stage polycondensation step in which the polycarbonate obtained in the first-stage polycondensation step is fed to a horizontal stirring reactor which has a horizontal rotating shaft and mutually discontinuous stirring blades attached approximately perpendicularly to the horizontal rotating shaft and in which when the length of the horizontal rotating shaft and the rotation diameter of the stirring blades are respectively expressed by L and D, then L/D is 1-15, and a polycondensation reaction is conducted at a temperature of 210° C. to 270° C. to obtain a polycarbonate having a reduced viscosity of 0.20-1.70 dL/g.

[5] The process according to any one of [1] to [4], wherein the dihydroxy compounds further include at least one dihydroxy compound selected from the group consisting of alicyclic dihydroxy compounds, aliphatic dihydroxy compounds, oxyalkylene glycols, aromatic dihydroxy compounds, and diols having a cyclic ether structure.

[6] The process for polycarbonate according to any one of [1] to [5], wherein the dihydroxy compound having at least one linking group —CH$_2$—O— in the molecule thereof comprises a dihydroxy compound represented by the following general formula (1).

[Chem. 1]

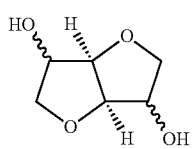

(1)

[7] The process according to [6], wherein the proportion of the dihydroxy compound represented by general formula (1) to all dihydroxy compounds is 10% by mole or higher.

[8] The process according to any one of [1] to [7], wherein the heating medium has a temperature of 270° C. or lower.

[9] A polycarbonate characterized by being obtained by subjecting one or more dihydroxy compounds comprising a dihydroxy compound having at least one linking group —CH$_2$—O— in the molecule thereof to melt polycondensation with a carbonic acid diester, and by having a reduced viscosity of from 0.40 dL/g to 1.70 dL/g and a formic acid content lower than 5 ppm by weight.

[10] The polycarbonate according to [9], which has a concentration of terminal phenyl groups of 30 µeq/g or higher.

[11] The polycarbonate according to [9] or [10], which has a phenol content of 500 ppm by weight or lower.

[12] The polycarbonate according to any one of [9] to [11], wherein the dihydroxy compound having at least one linking group —CH$_2$—O— in the molecule thereof comprises a dihydroxy compound represented by the following general formula (1).

[Chem. 2]

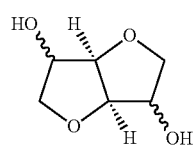

(1)

[13] The polycarbonate according to [12], wherein the content of the terminal double bond represented by the following structural formula (A) is 10 µeq/g or lower.

[Chem. 3]

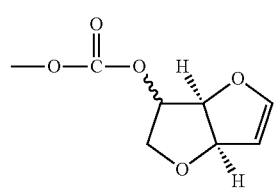

(A)

[14] A polycarbonate characterized by being obtained by the process according to any one of [1] to [8].

[15] The polycarbonate according to [14], which has a reduced viscosity of from 0.40 dL/g to 1.70 dL/g and a formic acid content lower than 5 ppm by weight.

[16] The polycarbonate according to [14] or [15], which has a concentration of terminal phenyl groups of 30 µeq/g or higher.

[17] The polycarbonate according to any one of [14] to [16], which has a phenol content of 500 ppm by weight or lower.

[18] The polycarbonate according to any one of [14] to [17], which contains a structure derived from a dihydroxy compound represented by the following general formula (1).

[Chem. 4]

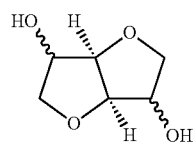

(1)

[19] The polycarbonate according to [18], wherein the content of the terminal double bond represented by the following structural formula (A) is 10 μeq/g or lower.

[Chem. 5]

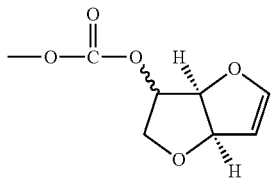
(A)

[20] A molded article characterized by comprising the polycarbonate according to any one of [9] to [19] or a composition of the polycarbonate.

Effects of the Invention

According to the processes of the invention, a high-quality polycarbonate reduced in coloration, etc. can be stably and efficiently produced. The polycarbonate of the invention has high thermal stability, a low refractive index, a large Abbe number, low optical anisotropy, and excellent mechanical strength, thermal stability, and color tone and can be regulated so as to have a glass transition temperature in the range of, for example, from 45° C. to 155° C. according to applications. The polycarbonate can hence be provided as materials for a wide range of fields including the field of films or sheets where flexibility is necessary, the field of bottles or containers where heat resistance is necessary, lens applications such as camera lenses, finder lenses, and lenses for CCDs or CMOSs, films for optical use, such as retardation films, diffusion sheets, and polarizing films for use in liquid-crystal or plasma displays or the like, and binder applications where sheets, optical disks, optical materials, optical parts, pigments, charge transfer agents, and the like are fixed.

Figure 1:
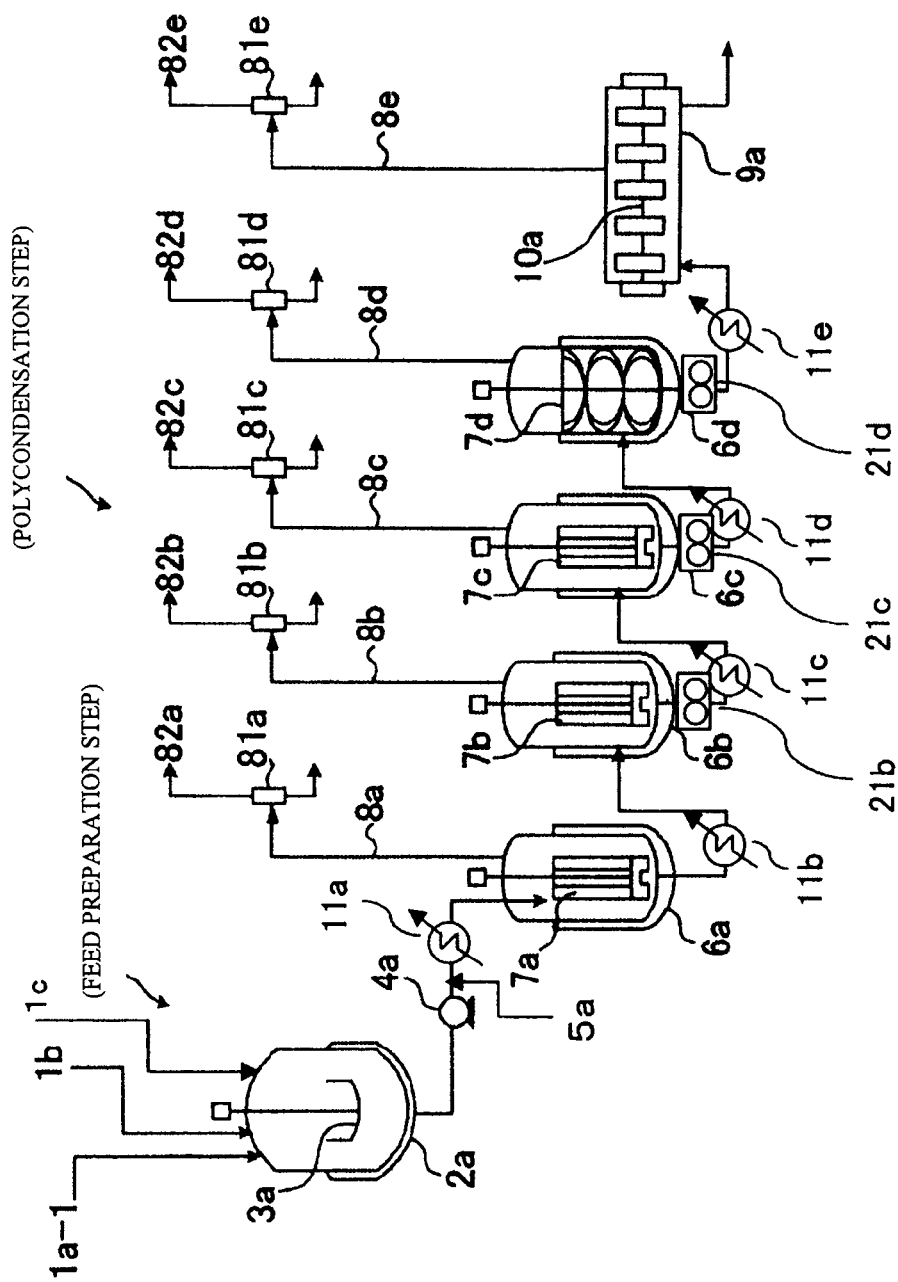
FIG. 1 is a view illustrating an example of production apparatus according to a process for polycarbonate production (I) of the invention.

DESCRIPTION OF REFERENCE NUMERALS AND SIGNS 1a-1 Starting-material (carbonic acid diester) feed opening
1b, 1c Starting-material (dihydroxy compound) feed opening
2a Starting-material mixing tank
3a Anchor-type stirring blade
4a Starting-material feed pump
5a Catalyst supply opening
6a First vertical stirring reactor
6b Second vertical stirring reactor
6c Third vertical stirring reactor
6d Fourth vertical stirring rector
7a, 7b, 7c MAXBLEND blade
7d Helical ribbon blade
8a, 8b, 8c, 8d, 8e Distillate tube
9a Fifth horizontal stirring reactor
10a Stirring blade
81a, 81b, 81c, 81d, 81e Condenser
82a, 82b, 82c, 82d, 82e Pressure-reducing device
11a, 11b, 11c, 11d, 11e Preheater
21b, 21c, 21d Gear pump

BEST MODE FOR CARRYING OUT THE INVENTION

Embodiments of the invention are explained below in detail. The following explanations on constituent elements are for embodiments (typical embodiments) of the invention, and the invention should not be construed as being limited to the following unless the invention departs from the spirit thereof.

As described under [1] above, a process for polycarbonate production (I) of the invention (hereinafter, this process is sometimes referred to as "process (I) of the invention") includes subjecting one or more dihydroxy compounds including a dihydroxy compound having at least one linking group —$CH_2$—O— in the molecule thereof to melt polycondensation with a carbonic acid diester using at least two serially arranged reactors to produce a polycarbonate, and is characterized in that in at least one of the reactors, the difference between the temperature of a polymer and the temperature of a heating medium is regulated to 80° C. or smaller when the polycarbonate yielded has a reduced viscosity of 0.10 dL/g or lower, or to 60° C. or smaller when the polycarbonate yielded has a reduced viscosity exceeding 0.10 dL/g but not higher than 0.40 dL/g, or to 40° C. or smaller when the polycarbonate yielded has a reduced viscosity exceeding 0.40 dL/g.

As described under [4] above, the process for polycarbonate production (II) according to another aspect of the invention (hereinafter, this process is sometimes referred to as "process (II) of the invention") is a process for producing a polycarbonate by subjecting one or more dihydroxy compounds including a dihydroxy compound having at least one linking group —$CH_2$—O— in the molecule thereof to melt polycondensation with a carbonic acid diester with heating with a heating medium, and is characterized by including
a first-stage polycondensation step in which a mixture of the dihydroxy compounds and the carbonic acid diester is fed in a molten state to a vertical reactor equipped with a vertical rotating shaft and a stirring blade attached to the vertical rotating shaft, and a polycondensation reaction is conducted at a temperature of 150° C. to 270° C. to obtain a polycarbonate having a reduced viscosity of 0.03-0.40 dL/g and
a second-stage polycondensation step in which the polycarbonate obtained in the first-stage polycondensation step is fed to a horizontal stirring reactor which has a horizontal rotating shaft and mutually discontinuous stirring blades attached approximately perpendicularly to the horizontal rotating shaft and in which when the length of the horizontal rotating shaft and the rotation diameter of the stirring blades are respectively expressed by L and D, then L/D is 1-15, and a polycondensation reaction is conducted at a temperature of 210° C. to 270° C. to obtain the polycarbonate having a reduced viscosity of 0.20-1.70 dL/g.

The term "reduced viscosity" in the invention means a value (ηsp/c) obtained by examining a solution of the polycarbonate in a mixed solvent composed of phenol and 1,1,2,2-tetrachloroethane in a weight ratio of 1:1, at a temperature of 30.0° C.±0.1° C. and a concentration of 1.00 g/dL. A method of measuring the reduced viscosity will be described in detail in Examples.

As described under [9] above, the polycarbonate of the invention is characterized by being obtained by subjecting one or more dihydroxy compounds including a dihydroxy compound having at least one linking group —$CH_2$—O— in the molecule thereof to melt polycondensation with a carbonic acid diester, and by having a reduced viscosity of from 0.40 dL/g to 1.70 dL/g and a formic acid content lower than 5 ppm by weight. Alternatively, the polycarbonate is characterized by being obtained by the processes (I) or (II) of the invention, as described under [14] above.

As described above, one requirement for the present invention is to use one or more "dihydroxy compounds having at least one linking group —CH₂—O— in the molecule thereof" (hereinafter, these compounds are sometimes referred to as "dihydroxy compounds (I)").

The dihydroxy compounds (I) may be compounds of any structure so long as these compounds each have two alcoholic hydroxyl groups, contain in the molecule a structure having a linking group —CH₂—O—, and are capable of reacting with a carbonic acid diester in the presence of a polymerization catalyst to yield a polycarbonate.

The "linking group —CH₂—O—" in the dihydroxy compounds (I) means a structure which combines at each end with an atom other than a hydrogen atom to constitute the molecule. For such linking groups, a carbon atom is most preferred as the atom with which at least the oxygen atom can combine or as the atom with which both the carbon atom and the oxygen atom can combine. The number of "linking groups —CH₂—O—" in each dihydroxy compound (I) is 1 or larger, preferably 2 to 4.

Specifically, examples of the dihydroxy compounds (I) include compounds having an aromatic group as a side chain and having, in the main chain, ether groups each bonded to an aromatic group, such as 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, and 9,9-bis(4-(3-hydroxy-2,2-dimethylpropoxy)-phenyl)fluorene, anhydrous sugar alcohols represented by the dihydroxy compounds represented by the following general formula (1), and diols having a cyclic ether structure, such as, e.g., the spiro-glycol represented by the following formula (2).

[Chem. 6]

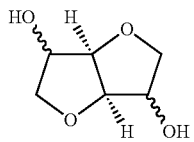

(1)

[Chem. 7]

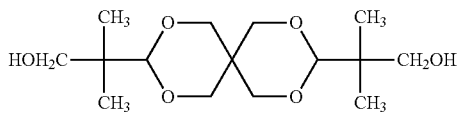

(2)

Those dihydroxy compounds (I) may be used either alone or in combination of two or more thereof. Those dihydroxy compounds (I) other than the dihydroxy compounds represented by general formula (1) can be used also as "other dihydroxy compounds", which will be described later.

Examples of the dihydroxy compounds represented by general formula (1) include isosorbide, isomannide, and isoidide, which are stereoisomers. These compounds may be used either alone or in combination of two or more thereof.

Most preferred of these dihydroxy compounds is isosorbide from the standpoints of availability, ease of production, optical properties, and moldability. Isosorbide is obtained by the dehydrating condensation of sorbitol, which is produced from various starches that are abundant resources and are easily available.

Isosorbide is apt to be gradually oxidized by oxygen. It is therefore important during storage or in handling during production that a free-oxygen absorber or a nitrogen atmosphere should be used in order to prevent decomposition by oxygen. Oxidation of isosorbide generates decomposition products including formic acid. In the case where isosorbide containing these decomposition products, for example, is used to produce a polycarbonate, these decomposition products cause coloration of the polycarbonate obtained or considerable deterioration of the properties thereof. There are even the cases where the decomposition products affect the polymerization reaction, making it impossible to obtain a high-molecular polymer. In the case where stabilizers serving to prevent the generation of formic acid have been added, some kinds of stabilizers cause coloration of the polycarbonate obtained or considerably impair the properties thereof. As the stabilizers, use is made of reducing agents and antacids. Examples of the reducing agents include sodium borohydride and lithium borohydride, while examples of the antacids include alkalis such as sodium hydroxide. However, when such an alkali metal salt is added, there are the cases where excessive addition thereof makes it impossible to control the polymerization reaction because the alkali metal functions also as a polymerization catalyst.

Isosorbide may be distilled according to need in order to obtain isosorbide containing no decomposition products. Also in the case where stabilizers have been incorporated in order to prevent the isosorbide from being oxidized or decomposed, this isosorbide may be distilled according to need in order to remove these stabilizers. In this case, the distillation of the isosorbide may be simple distillation or continuous distillation, and is not particularly limited. With respect to the atmosphere, an inert gas atmosphere such as, e.g., argon or nitrogen is formed before the isosorbide is distilled at a reduced pressure.

By subjecting, for example, isosorbide to such distillation, the purity thereof can be heightened to a formic acid content of below 20 ppm, preferably 10 ppm or lower, especially 5 ppm or lower. In the invention, it is preferred to use isosorbide having such a high purity. A method for determining the content of formic acid in isosorbide will be described in detail in Examples.

In the invention, dihydroxy compounds other than the dihydroxy compounds represented by general formula (1) can be used together with a dihydroxy compound represented by general formula (1), as dihydroxy compounds forming constituent units of the polycarbonate. Examples of such optionally usable dihydroxy compounds include alicyclic dihydroxy compounds, aliphatic dihydroxy compounds, oxyalkylene glycols, aromatic dihydroxy compounds, and diols having a cyclic ether structure. Especially preferred of these constituent units are alicyclic dihydroxy compounds.

The alicyclic dihydroxy compounds usable in the invention are not particularly limited. However, compounds including a five-membered ring structure or six-membered ring structure are usually used. The six-membered ring structure may have a fixed chair or boat form constituted of covalent bonds. When an alicyclic dihydroxy compound of a five-membered ring or six-membered ring structure is used, the polycarbonate obtained can have enhanced heat resistance. The number of carbon atoms contained in each alicyclic dihydroxy compound is generally 70 or smaller, preferably 50 or smaller, more preferably 30 or smaller. The larger the number thereof, the higher the heat resistance. However, such an alicyclic dihydroxy compound is difficult to synthesize or difficult to purify or has a high cost. The smaller the number of carbon atoms, the easier the purification or procurement of the alicyclic dihydroxy compound.

Examples of the alicyclic dihydroxy compounds including a five-membered ring structure or six-membered ring structure which are usable in the invention include alicyclic dihydroxy compounds represented by the following general formula (II) or (III).

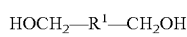  (II)

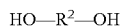  (III)

(In formulae (II) and (III), $R^1$ and $R^2$ represent a cycloalkyl group having 4-20 carbon atoms or a cycloalkoxy group having 6-20 carbon atoms.)

Cyclohexanedimethanol, which is an alicyclic dihydroxy compound represented by general formula (II), includes various isomers represented by general formula (II) in which $R^1$ is represented by the following general formula (IIa) (wherein $R^3$ represents either an alkyl group having 1-12 carbon atoms or a hydrogen atom). Specific examples thereof include 1,2-cyclohexanedimethanol, 1,3-cyclohexane-dimethanol, and 1,4-cyclohexanedimethanol.

[Chem. 8]

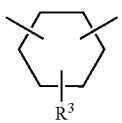  (IIa)

Tricyclodecanedimethanol and pentacyclopentadecanedimethanol, which are alicyclic dihydroxy compounds represented by general formula (II), include various isomers represented by general formula (II) in which $R^1$ is represented by the following general formula (IIb) (wherein n represents 0 or 1).

[Chem. 9]

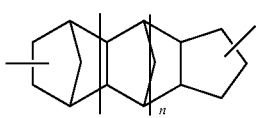  (IIb)

Decalindimethanol or tricyclotetradecanedimethanol, which is an alicyclic dihydroxy compound represented by general formula (II), includes various isomers represented by general formula (II) in which $R^1$ is represented by the following general formula (IIc) (wherein m represents 0 or 1). Specific examples thereof include 2,6-decalindimethanol, 1,5-decalindimethanol, and 2,3-decalindimethanol.

[Chem. 10]

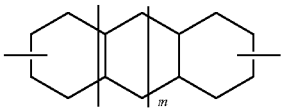  (IIc)

Norbornanedimethanol, which is an alicyclic dihydroxy compound represented by general formula (II), includes various isomers represented by general formula (II) in which $R^1$ is represented by the following general formula (IId). Specific examples thereof include 2,3-norbornanedimethanol and 2,5-norbornanedimethanol.

[Chem. 11]

  (IId)

Adamantanedimethanol, which is an alicyclic dihydroxy compound represented by general formula (II), includes various isomers represented by general formula (II) in which $R^1$ is represented by the following general formula (IIe). Specific examples thereof include 1,3-adamantanedimethanol.

[Chem. 12]

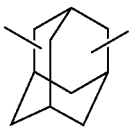  (IIe)

Meanwhile, cyclohexanediol, which is an alicyclic dihydroxy compound represented by general formula (III), includes various isomers represented by general formula (III) in which $R^2$ is represented by the following general formula (IIIa) (wherein $R^3$ represents either an alkyl group having 1-12 carbon atoms or a hydrogen atom). Specific examples thereof include 1,2-cyclohexanediol, 1,3-cyclohexanediol, 1,4-cyclohexanediol, and 2-methyl-1,4-cyclohexanediol.

[Chem. 13]

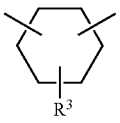  (IIIa)

Tricyclodecanediol and pentacyclopentadecanediol, which are alicyclic dihydroxy compounds represented by general formula (III), include various isomers represented by general formula (III) in which $R^2$ is represented by the following general formula (IIIb) (wherein n represents 0 or 1).

[Chem. 14]

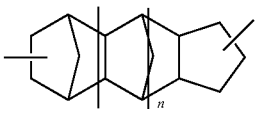  (IIIb)

Decalindiol or tricyclotetradecanediol, which is an alicyclic dihydroxy compound represented by general formula (III), includes various isomers represented by general formula (III) in which $R^2$ is represented by the following general formula (IIIc) (wherein m represents 0 or 1). Specific examples thereof include 2,6-decalindiol, 1,5-decalindiol, and 2,3-decalindiol.

[Chem. 15]

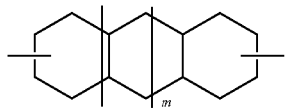

(IIIc)

Norbornanediol, which is an alicyclic dihydroxy compound represented by general formula (III), includes various isomers represented by general formula (III) in which $R^2$ is represented by the following general formula (IIId). Specific examples thereof include 2,3-norbornanediol and 2,5-norbornanediol.

[Chem. 16]

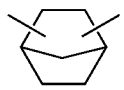

(IIId)

Adamantanediol, which is an alicyclic dihydroxy compound represented by general formula (III), includes various isomers represented by general formula (III) in which $R^2$ is represented by the following general formula (IIIe). Specific examples thereof include 1,3-adamantanediol.

[Chem. 17]

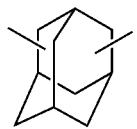

(IIIe)

Especially preferred of the examples of alicyclic dihydroxy compounds described above are cyclohexanedimethanols, tricyclodecanedimethanols, adamantanediols, and pentacyclopentadecanedimethanols. Preferred from the standpoints of availability and handleability are 1,4-cyclohexanedimethanaol, 1,3-cyclohexane-dimethanol, 1,2-cyclohexanedimethanol, and tricyclodecanedimethanol.

One of these alicyclic dihydroxy compounds may be used alone, or two or more thereof may be used in combination.

Examples of the aliphatic dihydroxy compounds usable in the invention include ethylene glycol, 1,3-propanediol, 1,2-propanediol, 1,4-butanediol, 1,3-butanediol, 1,2-butanediol, 1,5-heptanediol, and 1,6-hexanediol.

One of these aliphatic dihydroxy compounds may be used alone, or two or more thereof may be used in combination.

Examples of the oxyalkylene glycols usable in the invention include diethylene glycol, triethylene glycol, and tetraethylene glycol.

One of these oxyalkylene glycols may be used alone, or two or more thereof may be used in combination.

Examples of the aromatic dihydroxy compounds usable in the invention include 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis (4-hydroxy(3,5-diphenyl)phenyl)propane, 2,2-bis(4-hydroxy-3,5-dibromophenyl)propane, 2,2-bis(4-hydroxyphenyl)pentane, 2,4'-dihydroxydiphenylmethane, bis(4-hydroxy-phenyl)methane, bis(4-hydroxy-5-nitrophenyl)methane, 1,1-bis(4-hydroxyphenyl)-ethane, 3,3-bis(4-hydroxyphenyl)pentane, 1,1-bis(4-hydroxyphenyl)cyclohexane, bis(4-hydroxyphenyl) sulfone, 2,4'-dihydroxydiphenyl sulfone, bis(4-hydroxyphenyl) sulfide, 4,4'-dihydroxydiphenyl ether, 4,4'-dihydroxy-3,3'-dichlorodiphenyl ether, 4,4'-dihydroxy-2,5-diethoxydiphenyl ether, 9,9-bis(4-(2-hydroxyethoxy)phenyl)fluorene, 9,9-bis(4-(2-hydroxyethoxy-2-methyl)phenyl)fluorene, 9,9-bis(4-hydroxyphenyl)fluorene, and 9,9-bis(4-hydroxy-2-methylphenyl)fluorene.

One of these aromatic dihydroxy compounds may be used alone, or two or more thereof may be used in combination.

Examples of the diols having a cyclic ether structure which are usable in the invention include the spiro-glycol represented by formula (2) given above and dioxane glycol.

One of these diols having a cyclic ether structure may be used alone, or two or more thereof may be used in combination.

The compounds shown above are mere examples of the alicyclic dihydroxy compounds, aliphatic dihydroxy compounds, oxyalkylene glycols, aromatic dihydroxy compounds, and diols having a cyclic ether structure which are usable in the invention. The dihydroxy compounds usable in the invention should not be construed as being limited to those examples in any way. One of those compounds or two or more thereof can be used together with a dihydroxy compound represented by general formula (1). Hereinafter, those dihydroxy compounds are sometimes referred to as "other dihydroxy compounds".

Use of such other dihydroxy compounds can produce the effect of improving flexibility, improving heat resistance, or improving moldability, etc. according to applications. The proportion of a dihydroxy compound represented by general formula (1) to all dihydroxy compounds constituting the polycarbonate of the invention is not particularly limited. However, the proportion thereof is preferably 10% by mole or higher, more preferably 40% by mole or higher, even more preferably 60% by mole or higher, and is preferably 90% by mole or lower, more preferably 80% by mole or lower. Too high contents of constituent units derived from the other dihydroxy compounds may result in the cases where the inherent optical properties are impaired.

In the case where an alicyclic dihydroxy compound among the other dihydroxy compounds is used, the total proportion of a dihydroxy compound represented by general formula (1) and the alicyclic dihydroxy compound to all dihydroxy compounds constituting the polycarbonate is not particularly limited. However, the total proportion thereof is preferably 80% by mole or higher, more preferably 90% by mole or higher, especially preferably 95% by mole or higher.

In the polycarbonate of the invention, the proportion of the content of constituent units derived from a dihydroxy compound represented by general formula (1) to the content of constituent units derived from the alicyclic dihydroxy compound can be selected at will. However, it is preferred that [constituent units derived from the dihydroxy compound represented by general formula (1)]:[constituent units derived from the alicyclic dihydroxy compound] should be from 1:99 to 99:1 (% by mole). It is especially preferred that [constituent units derived from the dihydroxy compound represented by general formula (1)]:[constituent units derived from the alicyclic dihydroxy compound] should be from 10:90 to 90:10 (% by mole). In the case where the amount of constituent units derived from the dihydroxy compound represented by general formula (1) is larger than that range and where the amount of constituent units derived from the alicyclic dihydroxy compound is smaller than that range, the polycarbonate is apt to be colored. Conversely, in the case where the amount of constituent units derived from the dihydroxy compound represented by general formula (1) is smaller than the lower limit and the amount of constituent units derived from the alicyclic dihydroxy compound is larger than the upper limit, the polycarbonate tends to have an insufficient molecular weight.

When an aliphatic dihydroxy compound, an oxyalkylene glycol, an aromatic dihydroxy compound, and a diol having a cyclic ether structure are used, then the total proportion of a dihydroxy compound represented by general formula (1) and those dihydroxy compounds to all dihydroxy compounds constituting the polycarbonate is not particularly limited, and can be selected at will. Furthermore, the proportion of the content of constituent units derived from the dihydroxy compound represented by general formula (1) to the content of constituent units derived from those dihydroxy compounds is also not particularly limited, and can be selected at will.

In the processes (I) and (II) of the invention (hereinafter, these processes are sometimes referred to simply as "processes of the invention"), the dihydroxy compounds undergo melt polycondensation with a carbonic acid diester in the presence of a polymerization catalyst to yield a polycarbonate.

Examples of the carbonic acid diester to be used in this melt polymerization method generally include carbonic acid diesters represented by the following general formula (3).

[Chem. 18]

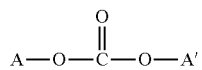

(3)

[In general formula (3), A and A' represent an aliphatic group which has 1-18 carbon atoms and may have a substituent or an aromatic group which may have a substituent; and A and A' may be the same or different.]

Examples of the carbonic acid diesters represented by general formula (3) include diphenyl carbonate, substituted diphenyl carbonates represented by ditolyl carbonate, dimethyl carbonate, diethyl carbonate, and di-t-butyl carbonate. Especially preferred examples thereof include diphenyl carbonate and substituted diphenyl carbonates. One of these carbonic acid diesters may be used alone, or a mixture of two or more thereof may be used.

It is preferred that the carbonic acid diester should be used in such an amount that the molar proportion thereof to all dihydroxy compounds to be subjected to the reaction is from 0.90 to 1.10. The molar proportion thereof is more preferably from 0.96 to 1.04. In the case where the molar proportion thereof is smaller than 0.90, the polycarbonate produced has an increased amount of terminal OH groups to have impaired thermal stability, or a polymer having a desired high molecular weight cannot be obtained. In the case where the molar proportion thereof is larger than 1.10, the rate of the transesterification reaction decreases when the reaction is conducted under the same conditions, or it is difficult to produce a polycarbonate having a desired molecular weight. In addition, the polycarbonate copolymer produced contains a larger amount of the carbonic acid diester remaining therein, and there are even the cases where the residual carbonic acid diester causes an odor during molding or makes the molded article odorous.

The proportions of the dihydroxy compound represented by general formula (1), alicyclic dihydroxy compound, and other dihydroxy compounds to be used are the same as the above-described proportions of constituent units derived from the respective dihydroxy compounds constituting the polycarbonate of the invention.

As the polymerization catalyst (transesterification catalyst) in the melt polymerization, use may be made of a compound of a Group-1 metal according to the long form of the periodic table (Nomenclature of Inorganic Chemistry IUPAC Recommendations 2005) (Group-1 metal compound) and/or a compound of a Group-2 metal according to that periodic table (Group-2 metal compound). It is possible to use a basic compound, such as, e.g., a basic boron compound, basic phosphorus compound, basic ammonium compound, or amine compound, as an auxiliary ingredient together with the Group-1 metal compound and/or Group-2 metal compound. It is, however, especially preferred that a Group-1 metal compound and/or a Group-2 metal compound should be used alone.

Examples of the Group-1 metal compound usable as the polymerization catalyst include sodium hydroxide, potassium hydroxide, lithium hydroxide, cesium hydroxide, sodium hydrogen carbonate, potassium hydrogen carbonate, lithium hydrogen carbonate, cesium hydrogen carbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, phenylated sodium boride, phenylated potassium boride, phenylated lithium boride, phenylated cesium boride, sodium benzoate, potassium benzoate, lithium benzoate, cesium benzoate, disodium hydrogen phosphate, dipotassium hydrogen phosphate, dilithium hydrogen phosphate, dicesium hydrogen phosphate, disodium phenylphosphate, dipotassium phenylphosphate, dilithium phenylphosphate, dicesium phenylphosphate, alcoholates or phenolates of sodium, potassium, lithium, and cesium, and the disodium salt, dipotassium salt, dilithium salt, and dicesium salt of bisphenol A.

Examples of the Group-2 metal compound include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

One of these Group-1 metal compounds and/or Group-2 metal compounds may be used alone, or two or more thereof may be used in combination.

Examples of the basic boron compound usable in combination with the Group-1 metal compound and/or Group-2 metal compound include the sodium salts, potassium salts, lithium salts, calcium salts, barium salts, magnesium salts, or strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron, and butyltriphenylboron.

Examples of the basic phosphorus compound include triethylphosphine, tri-n-propylphosphine, triisopropylphosphine, tri-n-butylphosphine, triphenylphosphine, tributylphosphine, and quaternary phosphonium salts.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

With respect to those basic compounds also, one compound may be used alone or two or more compounds may be used in combination.

When a Group-1 metal compound and/or a Group-2 metal compound is employed, the amount of the polymerization catalyst to be used is in the range of generally 0.1-100 µmol, preferably in the range of 0.5-50 µmol, more preferably in the range of 0.5-10 µmol, in terms of the amount of the metal(s) per mole of all dihydroxy compounds to be subjected to the reaction. In the case where the polymerization catalyst is used in too small an amount, polymerization activity necessary for producing a polycarbonate having a desired molecular weight is not obtained. On the other hand, in the case where the polymerization catalyst is used in too large an amount, the resultant polycarbonate has an impaired hue, or the polymerization yields by-products, different bonds, and different ends, resulting in decreases in thermal stability and flowability and enhanced gel generation. It is therefore difficult to produce a polycarbonate of target quality.

In the invention, the dihydroxy compound (I), for example, a dihydroxy compound represented by general formula (1), may be fed as a solid or may be heated and fed in a molten state. Alternatively, the dihydroxy compound (I) may be fed as an aqueous solution.

On the other hand, another dihydroxy compound also may be fed as a solid or may be heated and fed in a molten state. When the compound is soluble in water, it may be fed as an aqueous solution.

The feeding of these starting-material dihydroxy compounds in a molten state or as an aqueous solution has an advantage that metering and transportation are easy in industrial production.

[Process for Polycarbonate Production (I) of the Invention]

In the process (I) of the invention, the dihydroxy compounds are reacted with a carbonic acid diester (melt polycondensation) in the presence of a polymerization catalyst in a multistage manner including two or more stages using at least two serially arranged reactors, whereby a polycarbonate is produced.

Specifically, the first-stage reaction may be conducted at a temperature of generally 140-280° C., preferably 180-240° C., for a period of 0.1-10 hours, preferably 0.5-3 hours. In the second and succeeding stages, the reaction temperature is elevated while gradually lowering the pressure of the reaction system from the first-stage pressure. Simultaneously therewith, the phenol which generates is continuously removed from the reaction system. Finally, the polycondensation reaction is conducted at a reaction system pressure of 200 Pa or lower and a temperature in the range of generally 210-280° C., preferably 220-260° C. The term pressure as used in the invention means the so-called absolute pressure, which is expressed on the basis of vacuum. From the standpoint of effective utilization of resources, it is preferred that the phenol which has generated should be purified according to need and then reused as a starting material for diphenyl carbonate, bisphenol A, etc.

In the process (I) of the invention, the difference between the temperature of the polymer and the temperature of the heating medium, in a reactor, is further regulated to 80° C. or smaller when the polycarbonate yielded has a reduced viscosity of 0.10 dL/g or lower, or to 60° C. or smaller when the polycarbonate yielded has a reduced viscosity exceeding 0.10 dL/g but not higher than 0.40 dL/g, or to 40° C. or smaller when the polycarbonate yielded has a reduced viscosity exceeding 0.40 dL/g.

As stated above, the reactors to be used here are at least two reactors which have been serially connected. Although the number of reactors to be connected is not particularly limited, the number thereof is preferably 2 to 7. The kinds of the reactors also are not particularly limited. However, it is preferred that the first-stage reactor should be one or more vertical stirring reactors, while the second-stage reactor should be one or more horizontal stirring reactors. The reactors may be connected directly, or may be connected through a preheater or the like according to need.

Furthermore, in the first-stage reactor, the difference between the polymer temperature and the temperature of the heating medium is regulated in the following manner. When the polycarbonate yielded has a reduced viscosity of 0.10 dL/g or lower, that difference is regulated to generally 80° C. or smaller, preferably 50° C. or smaller, more preferably 30° C. or smaller. When the polycarbonate has a reduced viscosity exceeding 0.10 dL/g but not higher than 0.40 dL/g, that difference is regulated to generally 60° C. or smaller, preferably 40° C. or smaller, more preferably 20° C. or smaller. When the polycarbonate has a reduced viscosity exceeding 0.40 dL/g, that difference is regulated to generally 40° C. or smaller, preferably 30° C. or smaller, more preferably 20° C. or smaller.

In the case where a plurality of vertical stirring reactors are disposed, it is preferred to set the reactors so that temperature is elevated by stages through the vessels and pressure is reduced by stages through the vessels.

Moreover, in the second-stage reactor, the difference between the polymer temperature and the temperature of the heating medium is regulated in the following manner. When the polycarbonate yielded has a reduced viscosity of 0.30 dL/g or lower, that difference is regulated to generally 60° C. or smaller, preferably 40° C. or smaller, more preferably 20° C. or smaller. When the polycarbonate has a reduced viscosity exceeding 0.30 dL/g but not higher than 0.40 dL/g, that difference is regulated to generally 50° C. or smaller, preferably 30° C. or smaller, more preferably 20° C. or smaller. When the polycarbonate has a reduced viscosity exceeding 0.40 dL/g, that difference is regulated to generally 40° C. or smaller, preferably 30° C. or smaller, more preferably 20° C. or smaller.

In this process of the invention, a suitable upper-limit temperature of the heating medium is generally 300° C., preferably 270° C., especially 260° C. In the case where the heating medium has too high a temperature, there are the cases where thermal deterioration is accelerated, resulting in troubles such as an increase in the amount of different ends, enhanced generation of by-products including formic acid, and an impaired color tone. There is no particular lower limit on the temperature thereof so long as the reaction temperature can be maintained.

As described above, the reduced viscosity of the polycarbonate yielded is used as an index to keep the difference between the polymer temperature and the temperature of the heating medium in the reactor at the given value. As a result, not only an abrupt increase in polymer temperature within the reactor is avoided but also a heated state suitable for the viscosity of the polymer within the reactor can be realized. Because of this, different ends, by-products, colored substances, etc. can be inhibited from generating on the inner wall of the reactor and on the surface of a heat exchanger, in particular, around the gas/liquid interface. Consequently, the polycarbonate of the invention thus yielded has excellent thermal stability, transparency, and color tone.

In order to effectively practice the invention, a polymer can be heated with a preheater before being fed to a reactor. When this method is employed, not only the given temperature difference can be easily attained in the reactor because the polymer is heated by stages with both the preheater and the reactor, but also the formation of colored substances in the reactor can be rendered nil because a reduction in temperature difference can be attained in the reactor. It is also possible to use a method in which a polymer is heated to a desired polymerization temperature with a preheater only and this polymer in a reactor is only slightly heated to such a degree as to maintain the temperature, whereby a further reduced temperature difference can be attained.

Furthermore, at least two reactors disposed serially may be used to practice the process without using a preheater.

Any known reactors may be used in the invention. Examples thereof include jacket-type reactors employing hot oil or steam as a heating medium or reactors having a heat-transfer coil tube inside.

The preheater may be any known preheater so long as the known preheater is in common use. Examples thereof include multitubular or double-tube heat exchangers. A preheater which has no gas phase on the polymer side and includes no dead space is preferred. The preheater is disposed usually at the inlet of the reactor.

The term "difference between the polymer temperature and the temperature of the heating medium" means the difference between the temperature of the polymer within the reactor and the temperature of the heating medium being supplied to the reactor. The temperatures of the fluids each can be measured by a method in ordinary use.

The heating medium to be used in the reactor and preheater may be any heating medium in ordinary use. Examples thereof include hot oil and steam.

The process (I) of the invention is explained below in greater detail.

In the process (I) of the invention, the dihydroxy compounds, for example, isosorbide and an alicyclic dihydroxy compound, and diphenyl carbonate (DPC) as a carbonic acid diester compound are mixed together as starting-material monomers each in a molten state to prepare a starting-material molten mixture (starting-material preparation step), and these compounds are subjected in the molten state to a multistage polycondensation reaction using a plurality of reactors in the presence of a polymerization catalyst (polycondensation step). The type of reaction operation may be any of a batch type, a continuous type, and a combination of batch and continuous types. As the reactors, use may be made of a plurality of vertical stirring reactors (first-stage polycondensation step) and at least one horizontal stirring reactor succeeding the vertical stirring reactors (second-stage polycondensation step). Usually, these reactors are serially disposed and the process is performed continuously.

After the first-stage and second-stage polycondensation steps, the reaction is terminated and the following and other steps may be suitably conducted additionally: a step in which the unreacted starting materials and by-products of the reaction which are contained in the liquid polymerization reaction mixture are removed by volatilization; a step in which a heat stabilizer, release agent, colorant, etc. are added; and a step in which the polycarbonate obtained is formed into pellets of a given particle diameter.

Each step of the production process is then explained in greater detail.

(Starting-Material Preparation Step)

The dihydroxy compounds and carbonic acid diester compound to be used as starting materials for a polycarbonate are usually mixed together using a batch, semi-batch, or continuous stirring-vessel type device in an atmosphere of an inert gas such as nitrogen or argon to prepare a starting-material molten mixture. A temperature for melt mixing is selected from the range of generally 90° C.-180° C., preferably 100° C.-120° C., when isosorbide and an alicyclic dihydroxy compound are used as the dihydroxy compounds and diphenyl carbonate is used as the carbonic acid diester.

(First-Stage Polycondensation Step)

First, the mixture of dihydroxy compounds and a carbonic acid diester is fed in a molten state to a vertical reactor equipped with a vertical rotating shaft and a stirring blade attached to the vertical rotating shaft, and a polycondensation reaction is conducted at a temperature of 150° C. to 270° C. to obtain a polycarbonate having a reduced viscosity of 0.03-0.40 dL/g.

This reaction is continuously conducted generally using one or more vessels, preferably in a multi-vessel manner using 2-6 vessels. The reaction temperature is generally 140° C.-280° C., preferably 180° C.-240° C., and the pressure may be from ordinary pressure to 1.3 Pa. In the case of a multi-vessel continuous reaction, it is preferred that the temperature should be successively elevated through the vessels and the pressure should be successively reduced through the vessels.

The average residence time is generally 0.1-10 hours, preferably 0.5-5 hours, more preferably 0.5-3 hours. The reduced viscosity is preferably 0.03-0.40 dL/g, more preferably 0.03-0.38 dL/g.

The difference between the polymer temperature and the temperature of the heating medium is as follows. When the reduced viscosity of the polycarbonate yielded is 0.10 dL/g or lower, that difference is regulated to generally 80° C. or smaller, preferably 5020 C. or smaller, more preferably 30° C. or smaller. When the reduced viscosity thereof is higher than 0.10 dL/g but not higher than 0.40 dL/g, that difference is regulated to generally 60° C. or smaller, preferably generally 40° C. or smaller, more preferably 20° C. or smaller. When the reduced viscosity thereof exceeds 0.40 dL/g, that difference is regulated to 40° C. or smaller, preferably 30° C. or smaller, more preferably 20° C. or smaller. In the case where a plurality of vertical stirring reactors are disposed, it is preferred to set the reactors so that temperature is elevated by stages through the vessels and pressure is reduced by stages through the vessels.

(Second-Stage Polycondensation Step)

Next, the polycarbonate obtained in the first-stage polycondensation step is fed to a horizontal stirring reactor which has a horizontal rotating shaft and mutually discontinuous stirring blades attached approximately perpendicularly to the horizontal rotating shaft and in which when the length of the horizontal rotating shaft and the rotation diameter of the stirring blades are respectively expressed by L and D, then L/D is 1-15, and a polycondensation reaction is conducted at a temperature of 210° C. to 280° C. to obtain a polycarbonate having a reduced viscosity of 0.20-1.70 dL/g.

This reaction is continuously conducted using generally one or more, preferably 1-3 horizontal stirring reactors. The L/D of the horizontal reactors is preferably 2-14. The reaction temperature is preferably 220-270° C., more preferably 220-260° C., and pressure is generally from 13.3 kPa to 1.3 Pa, preferably from 1 kPa to 1.3 Pa. The average residence time is generally 0.1-10 hours, preferably 0.5-5 hours, more preferably 0.5-2 hours. The reduced viscosity is preferably 0.35-1.60 dL/g, more preferably 0.45-1.00 dL/g.

In the second-stage reactor, the difference between the polymer temperature and the temperature of the heating medium is as follows. When the reduced viscosity of the polycarbonate yielded is 0.30 dL/g or lower, that difference is regulated to generally 60° C. or smaller, preferably 40° C. or smaller, more preferably 20° C. or smaller. When the reduced viscosity thereof is higher than 0.30 dL/g but not higher than 0.40 dL/g, that difference is regulated to generally 50° C. or smaller, preferably 30° C. or smaller, more preferably 20° C. or smaller. When the reduced viscosity thereof exceeds 0.40 dL/g, that difference is regulated to 40° C. or smaller, preferably 30° C. or smaller, more preferably 20° C. or smaller.

The reactors operated in a multi-vessel manner are set so that temperature and the degree of vacuum increase by stages within the reaction conditions shown above, in order to more effectively remove the phenol which generates as a by-product as the polycondensation reaction proceeds. From the standpoint of preventing the polycarbonate to be obtained from deteriorating in quality, e.g., color tone, it is preferred to set each reactor so as to have a temperature which is as low as possible and a residence time which is as short as possible.

In the case where the polycondensation steps are conducted in a multi-vessel manner, a plurality of reactors including a vertical stirring reactor are generally disposed to increase the average molecular weight (reduced viscosity) of the polycarbonate resin.

As the reactors, use may be made of, for example, a stirring vessel type reactor, thin-film reactor, centrifugal thin-film evaporator, surface replacement type twin-screw kneading reactor, two-shaft horizontal stirring reactor, wetted-wall type reactor, perforated-plate type reactor in which monomers are polymerized while being allowed to fall freely, a perforated-plate type reactor equipped with wires in which monomers are polymerized while being allowed to fall along the wires, and the like.

Examples of the type of stirring blade of the vertical stirring reactor include a turbine blade, paddle blade, Pfaudler blade, anchor blade, FULLZONE blade (manufactured by Shinko Pantec Co., Ltd.), SANMELER blade (manufactured by Mitsubishi Heavy Industries, Ltd.), MAXBLEND blade (manufactured by Sumitomo Heavy Industries, Ltd.), helical ribbon blade, and lattice type twisting blade (manufactured by Hitachi, Ltd.).

The term horizontal stirring reactor means a reactor in which the stirring-blade rotating shaft is horizontal (extends in a horizontal direction). Examples of the type of stirring blade of the horizontal stirring reactor include single-shaft type stirring blades such as disk type and paddle type blades and two-shaft type stirring blades such as HVR, SCR, N-SCR (manufactured by Mitsubishi Heavy Industries, Ltd.), BIV-OLAC (manufactured by Sumitomo Heavy Industries, Ltd.), and spectacle-shaped blades and lattice blades (manufactured by Hitachi, Ltd.).

The polymerization catalyst to be used in the polycondensation of the dihydroxy compounds with the carbonic acid diester compound is usually prepared as an aqueous solution beforehand. The concentration of the aqueous catalyst solution is not particularly limited, and the solution is regulated so as to have any desired concentration according to the solubility of the catalyst in water. It is possible to select another solvent such as, e.g., acetone, an alcohol, toluene, or phenol in place of water.

The properties of the water to be used for dissolving the catalyst are not particularly limited so long as the kinds and concentrations of impurities contained therein are constant. However, it is usually preferred to use distilled water, deionized water, or the like.

(Production Apparatus)

Next, an example of the process (I) of the invention to which this embodiment is applied is described in detail on the basis of a drawing.

FIG. 1 is a view illustrating an example of production apparatus for use in the process (I) of the invention. In the production apparatus shown in FIG. 1, a polycarbonate of the invention is produced through a starting-material preparation step ("feed preparation step" in FIG. 1) in which the starting materials, i.e., the dihydroxy compounds and a carbonic acid diester compound, are prepared and first-stage and second-stage polycondensation steps in which these starting materials are subjected in a molten state to a polycondensation reaction using a plurality of reactors.

Thereafter, the reaction is terminated, and the liquid polymerization reaction mixture is subjected to a step (not shown) in which the unreacted starting materials and by-products of the reaction which are contained in the reaction mixture are removed by volatilization, a step (not shown) in which a heat stabilizer, release agent, colorant, etc. are added, and a step (not shown) in which the polycarbonate is formed into pellets of a given particle diameter.

The feed preparation step is provided with a starting-material mixing tank 2a and a starting-material feed pump 4a for feeding the prepared starting materials to the polycondensation step. The starting-material mixing tank 2a each is equipped with an anchor-type stirring blade 3a.

Diphenyl carbonate (DPC), as a carbonic acid diester, is fed in a molten state to the raw-material mixing tank 2a through a feed opening 1a-1, while isosorbide and an alicyclic dihydroxy compound, as the dihydroxy compounds, are fed in a molten state respectively through feed openings 1b and 1c and mixed with the molten DPC.

The subsequent polycondensation step is provided with a first vertical stirring reactor 6a, a second vertical stirring reactor 6b, a third vertical stirring reactor 6c, and a fourth vertical stirring reactor 6d which have been serially connected and with a fifth horizontal stirring reactor 9a disposed after and serially connected to the fourth vertical stirring reactor 6d.

The first vertical stirring reactor 6a, second vertical stirring reactor 6b, and third vertical stirring reactor 6c are equipped respectively with MAXBLEND blades 7a, 7b, and 7c. The fourth vertical stirring reactor 6d is equipped with a helical ribbon blade 7d. The fifth horizontal stirring reactor 9a is equipped with stirring blades 10a.

Furthermore, preheaters 11a, 11b, 11c, 11d, and 11e have been disposed. Gear pumps 21b, 21c, and 21d have also been disposed.

Incidentally, distillate tubes 8a, 8b, 8c, 8d, and 8e for discharging by-products generated by the polycondensation reaction and other substances have been attached respectively to the five reactors. The distillate tubes 8a, 8b, 8c, 8d, and 8e have been connected to condensers 81a, 81b, 81c, 81d, and 81e, respectively, and the reactors are kept in a given reduced-pressure state with pressure-reducing devices 82a, 82b, 82c, 82d, and 82e, respectively.

In the production apparatus shown in FIG. 1, a DPC melt prepared at a given temperature in a nitrogen gas atmosphere and melts of isosorbide and an alicyclic dihydroxy compound which have been metered in a nitrogen gas atmosphere are continuously fed to the starting-material mixing tank 2a through the feed opening 1a-1 and the feed openings 1b and 1c, respectively.

Subsequently, the starting-material molten mixture is continuously fed to the first vertical stirring reactor 6a through a starting-material feed pump 4a and the preheater 11a. Furthermore, cesium carbonate in an aqueous solution state is continuously supplied as a catalyst through a catalyst supply opening 5a disposed somewhere in transport piping for the starting-material molten mixture.

In the first vertical stirring reactor 6a, a constant liquid level is maintained so as to result in an average residence time of, for example, 80 minutes and the polycondensation reaction is conducted in a nitrogen atmosphere, while maintaining the conditions of, for example, a temperature of 200° C., a pressure of 13.33 kPa (100 Torr), and a rotation speed of the MAXBLEND blade 7a of 160 rpm and while distilling off the by-product phenol through the distillate tube 8a. In this operation, the difference between the polymer temperature and the temperature of the heating medium is as described above.

Subsequently, the liquid polymerization reaction mixture discharged from the first vertical stirring reactor 6a is continuously and successively fed to the second vertical stirring reactor 6b through the preheater 11b, to the third vertical stirring reactor 6c through the preheater 11c with the gear pump 21b, to the fourth vertical stirring reactor 6d through the preheater 11d with the gear pump 21c, and to the fifth horizontal stirring reactor 9a through the preheater 11e with the gear pump 21d, whereby the polycondensation reaction proceeds. Reaction conditions in each reactor are set so that temperature and the degree of vacuum become higher and the rate of stirring becomes lower as the polycondensation reaction proceeds. During the polycondensation reaction, the liquid level in each reactor is regulated so as to result in an average residence time in the reactor of, for example, about 80 minutes. The by-product phenol is distilled off from the reactors through the distillate tubes 8b, 8c, 8d, and 8e.

In this operation, the difference between the polymer temperature and the temperature of the heating medium in each reactor or each preheater is as described above.

In this embodiment, by-products including phenol are continuously liquefied with and recovered through the condensers 81a and 81b, which have been attached respectively to the first vertical stirring reactor 6a and the second vertical stirring reactor 6b. Each of the condensers 81a and 81b may be divided into two or more condensers so that part or all of the distillate condensed in the condenser located nearest to the reactor is refluxed to the first vertical stirring reactor 6a or second vertical stirring reactor 6b. This configuration is preferred because the control of starting material molar ratio is facilitated thereby. Furthermore, cold traps (not shown) have been disposed on the downstream side of the condensers 81c, 81d, and 81e, which have been attached respectively to the third vertical stirring reactor 6c, fourth vertical stirring reactor 6d, and fifth horizontal stirring reactor 9a, to continuously solidify/recover by-products.

(Initiation of Melt Polycondensation in the Continuous Production Apparatus)

In this embodiment, the melt polycondensation of the dihydroxy compounds according to the invention with a carbonic acid diester, which is based on a transesterification reaction, is initiated according to the following procedure.

First, in the continuous production apparatus shown in FIG. 1, the five reactors connected serially (the first vertical stirring reactor 6a, second vertical stirring reactor 6b, third vertical stirring reactor 6c, fourth vertical stirring reactor 6d, and fifth horizontal stirring reactor 9a) are each set so as to have an internal temperature and a pressure which are suitable for the melt polycondensation based on a transesterification reaction.

Although the internal temperature, heating-medium temperature, and pressure of each reactor are not particularly limited, these conditions are usually as follows.

(Preheater 11a) 180° C.-230° C.
(First vertical stirring reactor 6a)
Internal temperature, 150° C.-250° C.; pressure, ordinary pressure to 13.3 kPa; temperature of heating medium, 220° C.-280° C.
(Preheater 11b) 200° C.-250° C.
(Second vertical stirring reactor 6b)
Internal temperature, 180° C.-250° C.; pressure, 70 kPa to 10 kPa; temperature of heating medium, 220° C.-280° C.
(Preheater 11c) 230° C.-270° C.
(Third vertical stirring reactor 6c)
Internal temperature, 220° C.-270° C.; pressure, 10 kPa to 0.1 kPa; temperature of heating medium, 220° C.-280° C.
(Preheater 11d) 230° C.-270° C.
(Fourth vertical stirring reactor 6d)
Internal temperature, 220° C.-270° C.; pressure, 1,000 Pa to 1 Pa; temperature of heating medium, 220° C.-280° C.
(Preheater 11e) 230° C.-270° C.
(Fifth horizontal stirring reactor 9a)
Internal temperature, 220° C.-270° C.; pressure, 500 Pa to 1 Pa; temperature of heating medium, 220-280° C.

Next, the starting-material mixing tank 2a is separately used to mix the dihydroxy compounds and a carbonic acid diester together in a given molar ratio in a nitrogen gas atmosphere to obtain a starting-material molten mixture.

Subsequently, after the internal temperature and pressure of each of the five reactors have reached values within the ranges of from −5% to +5% based on the respective set values, the starting-material molten mixture separately prepared in the starting-material mixing tank 2a is continuously fed to the first vertical stirring reactor 6a. Simultaneously with initiation of the feeding of the starting-material molten mixture, a catalyst begins to be continuously supplied to the first vertical stirring reactor 6a through the catalyst supply opening 5a to initiate the melt polycondensation based on a transesterification reaction.

In the first vertical stirring reactor 6a, in which melt polycondensation is conducted, the liquid level of the liquid polymerization reaction mixture is kept constant so as to result in a given average residence time. Examples of methods for keeping the liquid level within the first vertical stirring reactor 6a constant include a method in which the degree of opening of a valve (not shown) disposed in the vessel bottom part of a polymer discharge line is controlled while detecting the liquid level generally with a level or the like.

In this operation, the average residence time in the first vertical stirring reactor 6a is not particularly limited. However, the average residence time therein is generally from 30 minutes to 120 minutes.

Subsequently, the liquid polymerization reaction mixture is discharged from the bottom of the first vertical stirring reactor 6a and then continuously and successively fed to the second vertical stirring reactor 6b through the preheater 11b, to the third vertical stirring reactor 6c through the preheater 11c with the gear pump 21b, and to the fourth vertical stirring reactor 6d through the preheater 11d with the gear pump 21c. In this first-stage polycondensation step, a polycarbonate having a reduced viscosity of 0.03-0.40 dL/g, more preferably 0.05-0.40 dL/g, is obtained.

From the standpoint of the color tone of the polycarbonate, it is preferred that in the reaction apparatus in which the first-stage polycondensation step is conducted, the devices constituting the reaction apparatus and constituent parts including the piping should be ones in which the surfaces of the portions which come into contact with a starting-material monomer or with the liquid polymerization mixture (hereinafter referred to as "liquid-contact portions") are constituted of one or more materials selected from stainless steel having a nickel content of 10% by weight or higher, glass, nickel, tantalum, chromium, and Teflon (registered trademark) so that the one or more materials account for at least 90% of the total surface area of the liquid-contact portions. In the invention, the liquid-contact portions are not particularly limited in the materials thereof so long as the surface materials thereof are constituted of any of those substances. A laminate of any of those substances with another substance or a plated material obtained by depositing any of those substances on another substance can be used as the surface materials.

Subsequently, the polycarbonate obtained in the first-stage polycondensation step is fed with the gear pump 21d through the preheater 11e to a horizontal stirring reactor 9a which has a horizontal rotating shaft and mutually discontinuous stirring blades attached approximately perpendicularly to the horizontal rotating shaft and in which when the length of the horizontal rotating shaft and the rotation diameter of the stirring blades are respectively expressed by L and D, then L/D is 1-15. A polycondensation reaction is conducted therein under temperature/pressure conditions suitable for the second polycondensation reaction, such as those which will be shown later, while the phenol which generates as a by-product and part of the unreacted monomers are being removed from the system through the distillate tube 8e.

This horizontal stirring reactor 9a has one or more horizontal rotating shafts, and stirring blades have been disposed on the horizontal rotating shafts in at least two stages per rotating shaft. The stirring blades are of one kind or a combination of two or more kinds selected from the disk type, wheel type, paddle type, rod type, window frame type, and the like. This reactor 9a is a horizontal high-viscosity-liquid treatment device in which the reaction solution is lifted up or spread with the stirring blades to make the reaction solution undergo surface replacement. In this description, the term "surface replacement of a reaction solution" means the phenomenon in which a liquid-surface portion of the reaction solution is replaced by a portion of the reaction solution which underlies the liquid surface. As described above, the horizontal stirring reactor to be used in the invention is a device including a horizontal shaft and mutually discontinuous stirring blades attached approximately perpendicularly to the horizontal shaft, and has no screw part unlike extruders. In the process (I) of the invention, it is preferred to use at least one such horizontal stirring reactor.

The reaction temperature in the second-stage polycondensation step is in the range of generally 210-280° C., preferably 220-260° C., and the reaction pressure therein is generally from 13.3 kPa to 1.3 Pa, preferably from 1 kPa to 1.3 Pa, more preferably from 500 Pa to 10 Pa.

Compared to twin-screw vented extruders, the horizontal stirring reactor to be used in the process (I) of the invention has a high tendency to hold up due to the structure of the device. Because of this, reaction conditions (in particular, temperature) can be rendered milder by prolonging the residence time of a reaction mixture. Consequently, a polycarbonate having a further improved color tone and excellent mechanical properties can be obtained.

In this second-stage polycondensation step, a polycarbonate having a reduced viscosity of 0.20-1.70 dL/g, preferably 0.35-1.60 dL/g, more preferably 0.45-1.00 dL/g, is obtained.

During the melt polycondensation reaction, the liquid level in each reactor is regulated so as to result in a given average residence time. Although the average residence time in each reactor is not particularly limited, it is generally from 30 minutes to 120 minutes.

Incidentally, the phenol which generates as a by-product simultaneously with the melt polycondensation reaction in each reactor is distilled off from the system through the distillate tube (8a, 8b, 8c, 8d, or 8e) attached to the reactor.

As described above, in this embodiment, a starting-material molten mixture and a catalyst are continuously fed through a preheater after the internal temperatures and pressures of the five reactors in the continuous production apparatus shown in FIG. 1 have reached given values, whereby melt polycondensation based on a transesterification reaction is initiated.

Because of this, the average residence time of the liquid polymerization reaction mixture in each reactor becomes equal to that in stationary operation immediately after initiation of the melt polycondensation. As a result, the liquid polymerization reaction mixture does not undergo an unnecessary heat history and the polycarbonate resin obtained is reduced in the content of crystalline foreign matter and other foreign matter including gel particles or burned particles. Furthermore, this polycarbonate resin has a satisfactory color tone.

[Process for Polycarbonate Production (II) of the Invention]

In the process (II) of the invention also, a molten mixture of the dihydroxy compounds and a carbonic acid diester is prepared (starting-material preparation step) and these compounds are subjected in the molten state to a multistage polycondensation reaction using a plurality of reactors in the presence of a polymerization catalyst (polycondensation step), as in the process (I) of the invention, to thereby produce a polycarbonate.

The type of reaction operation may be any of a batch type, a continuous type, and a combination of batch and continuous types. As the reactors, use may be made of a plurality of vertical stirring reactors (first-stage polycondensation step) and at least one horizontal stirring reactor succeeding the vertical stirring reactors (second-stage polycondensation step). Usually, these reactors are serially disposed and the process is performed continuously.

After the first-stage and second-stage polycondensation steps, the reaction is terminated and the following and other steps may be suitably conducted additionally: a step in which the unreacted starting materials and by-products of the reaction which are contained in the liquid polymerization reaction mixture are removed by volatilization; a step in which a heat stabilizer, release agent, colorant, etc. are added; and a step in which the polycarbonate obtained is formed into pellets of a given particle diameter.

Each step of the production process is then explained in greater detail.

(Starting-Material Preparation Step)

The dihydroxy compounds and carbonic acid diester to be used as starting materials for a polycarbonate are usually mixed together using a batch, semi-batch, or continuous stirring-vessel type device in an atmosphere of an inert gas such as nitrogen or argon to prepare a starting-material molten mixture. A temperature for melt mixing is selected from the range of generally 90° C.-180° C., preferably 100° C.-120° C., when isosorbide and an alicyclic dihydroxy compound are used as the dihydroxy compounds and diphenyl carbonate is used as the carbonic acid diester.

(First-Stage Polycondensation Step)

First, the mixture of dihydroxy compounds and a carbonic acid diester is fed in a molten state to a vertical reactor equipped with a vertical rotating shaft and a stirring blade attached to the vertical rotating shaft, and a polycondensation reaction is conducted generally at a temperature of 140° C. to 280° C. to obtain a polycarbonate having a reduced viscosity of 0.03-0.40 dL/g.

This reaction is continuously conducted generally using one or more vessels, preferably in a multi-vessel manner using 2-6 vessels. The reaction temperature is preferably 180° C.-260° C., especially preferably 180° C.-240° C., and the pressure may be from ordinary pressure to 1.3 Pa. In the case of a multi-vessel continuous reaction, it is preferred that the temperature should be successively elevated through the vessels and the pressure should be successively reduced through the vessels.

The average residence time is generally 0.1-10 hours, preferably 0.5-5 hours, more preferably 0.5-3 hours. The reduced viscosity is preferably 0.03-0.40 dL/g, more preferably 0.03-0.38 dL/g.

(Second-Stage Polycondensation Step)

Next, the polycarbonate obtained in the first-stage polycondensation step is fed to a horizontal stirring reactor which has a horizontal rotating shaft and mutually discontinuous stirring blades attached approximately perpendicularly to the horizontal rotating shaft and in which when the length of the horizontal rotating shaft and the rotation diameter of the stirring blades are respectively expressed by L and D, then L/D is 1-15, and a polycondensation reaction is conducted at a temperature of 210° C. to 280° C. to obtain a polycarbonate having a reduced viscosity of 0.20-1.70 dL/g.

This reaction is continuously conducted using generally one or more, preferably 1-3 horizontal stirring reactors. The L/D of the horizontal reactors is preferably 2-14. The reaction temperature is preferably 220-270° C., more preferably 220-260° C., and pressure is generally from 13.3 kPa to 1.3 Pa, preferably from 1 kPa to 1.3 Pa. The average residence time is generally 0.1-10 hours, preferably 0.5-5 hours, more preferably 0.5-3 hours. The reduced viscosity is preferably 0.35-1.60 dL/g, more preferably 0.45-1.00 dL/g.

It is preferred that the reactors operated in a multi-vessel manner should be set so that temperature and the degree of vacuum increase by stages within the reaction conditions shown above, in order to more effectively remove the phenol which generates as a by-product as the polycondensation reaction proceeds. From the standpoint of preventing the polycarbonate to be obtained from deteriorating in quality, e.g., color tone, it is preferred to set each reactor so as to have a temperature which is as low as possible and a residence time which is as short as possible.

In the case where the polycondensation steps are conducted in a multi-vessel manner, a plurality of reactors including a vertical stirring reactor are disposed to increase the average molecular weight (reduced viscosity) of the polycarbonate resin as stated above.

The vertical reactors, the type of the stirring blades thereof, the horizontal stirring reactor, the type of the stirring blades thereof, etc. in this process are the same as in the process (I) of the invention.

The polymerization catalyst to be used in the polycondensation of the dihydroxy compounds with the carbonic acid diester compound is usually prepared as an aqueous solution beforehand. The concentration of the aqueous catalyst solution is not particularly limited, and the solution is regulated so as to have any desired concentration according to the solubility of the catalyst in water. It is possible to select another solvent such as, e.g., acetone, an alcohol, toluene, or phenol in place of water.

The properties of the water to be used for dissolving the catalyst are not particularly limited so long as the kinds and concentrations of impurities contained therein are constant. However, it is usually preferred to use distilled water, deionized water, or the like.

(Production Apparatus)

Next, an example of the process (II) of the invention is described in detail on the basis of a drawing.

Figure 2:
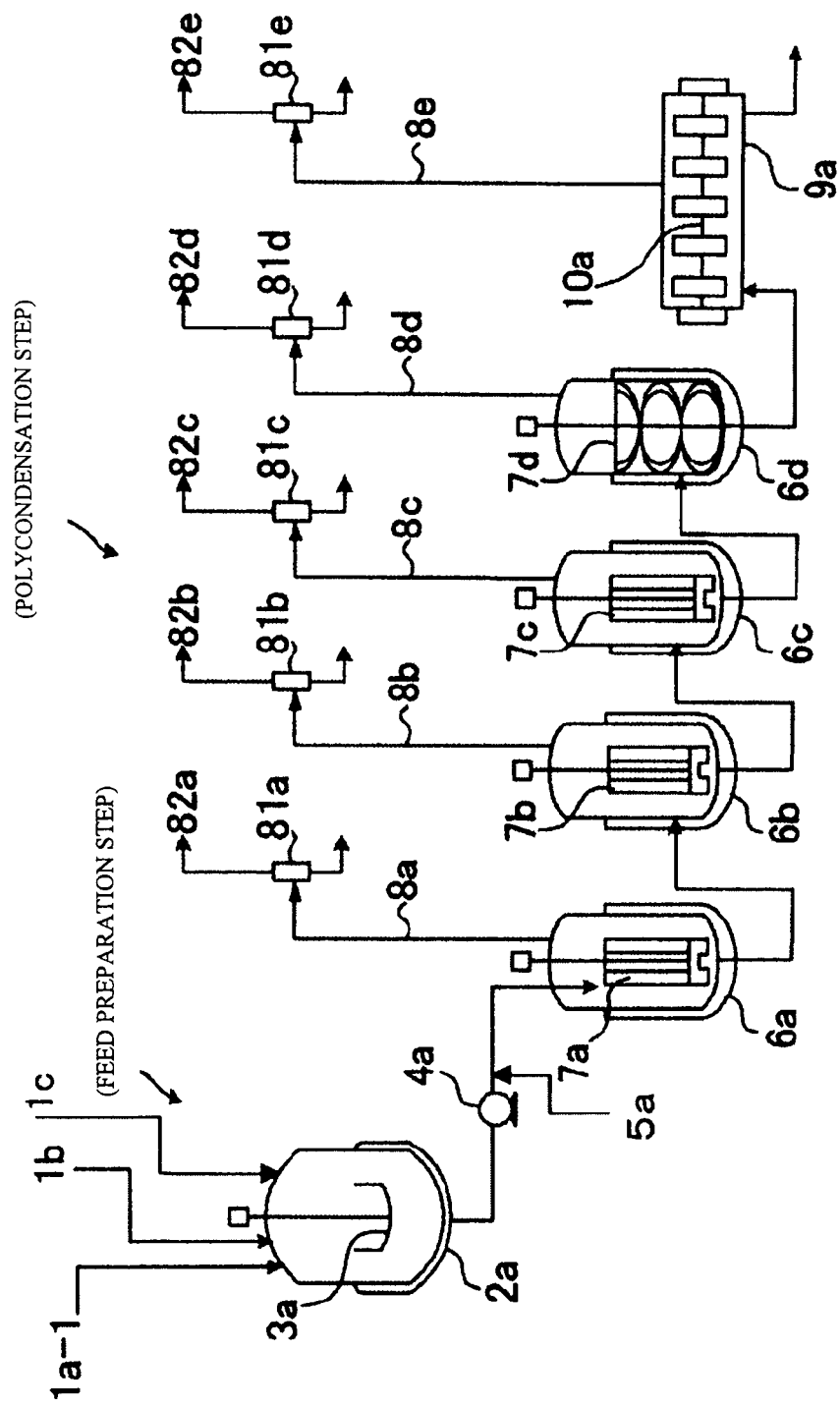
FIG. 2 is a view illustrating an example of production apparatus according to a process for polycarbonate production (II) of the invention.

FIG. 2 is a view illustrating an example of polycarbonate production apparatus used in the process (II) of the invention. In the production apparatus shown in FIG. 2, a polycarbonate is produced through a starting-material preparation step ("feed preparation step" in FIG. 2) in which the starting materials, i.e., the dihydroxy compounds and a carbonic acid diester compound, are prepared and first-stage and second-stage polycondensation steps in which these starting materials are subjected in a molten state to a polycondensation reaction using a plurality of reactors.

Thereafter, the reaction is terminated, and the liquid polymerization reaction mixture is subjected to a step (not shown) in which the unreacted starting materials and by-products of the reaction which are contained in the reaction mixture are removed by volatilization, a step (not shown) in which a heat stabilizer, release agent, colorant, etc. are added, and a step (not shown) in which the polycarbonate is formed into pellets of a given particle diameter, by which pellets of the polycarbonate are obtained.

The feed preparation step is provided with a starting-material mixing tank 2a and a starting-material feed pump 4a for feeding the prepared starting materials to the polycondensation step. The starting-material mixing tank 2a each is equipped with an anchor-type stirring blade 3a.

Diphenyl carbonate (DPC), as a carbonic acid diester, is fed in a molten state to the raw-material mixing tank 2a through a feed opening 1a-1, while isosorbide and an alicyclic dihydroxy compound, as the dihydroxy compounds, are fed in a molten state respectively through feed openings 1b and 1c and mixed with the molten DPC.

The subsequent polycondensation step is provided with a first vertical stirring reactor 6a, a second vertical stirring reactor 6b, a third vertical stirring reactor 6c, and a fourth vertical stirring reactor 6d which have been serially connected and with a fifth horizontal stirring reactor 9a disposed after and serially connected to the fourth vertical stirring reactor 6d.

The first vertical stirring reactor 6a, second vertical stirring reactor 6b, and third vertical stirring reactor 6c are equipped respectively with MAXBLEND blades 7a, 7b, and 7c. The fourth vertical stirring reactor 6d is equipped with a helical ribbon blade 7d. The fifth horizontal stirring reactor 9a is equipped with stirring blades 10a.

Incidentally, distillate tubes 8a, 8b, 8c, 8d, and 8e for discharging by-products generated by the polycondensation reaction and other substances have been attached respectively to the five reactors. The distillate tubes 8a, 8b, 8c, 8d, and 8e have been connected to condensers 81a, 81b, 81c, 81d, and 81e, respectively, and the reactors are kept in a given reduced-pressure state with pressure-reducing devices 82a, 82b, 82c, 82d, and 82e, respectively.

In the production apparatus shown in FIG. 2, a DPC melt prepared at a given temperature in a nitrogen gas atmosphere and melts of isosorbide and an alicyclic dihydroxy compound which have been metered in a nitrogen gas atmosphere are continuously fed to the starting-material mixing tank 2a through the feed opening 1a-1 and the feed openings 1b and 1c, respectively.

Subsequently, the starting-material molten mixture is continuously fed to the first vertical stirring reactor 6a through a starting-material feed pump 4a. Furthermore, cesium carbonate in an aqueous solution state is continuously supplied as a catalyst through a catalyst supply opening 5a disposed somewhere in transport piping for the starting-material molten mixture.

In the first vertical stirring reactor 6a, a constant liquid level is maintained so as to result in an average residence time of, for example, 60 minutes and the polycondensation reaction is conducted in a nitrogen atmosphere, while maintaining the conditions of, for example, a temperature of 200° C., a pressure of 13.3 kPa (100 Ton), and a rotation speed of the MAXBLEND blade 7a of 160 rpm and while distilling off the by-product phenol through the distillate tube 8a.

Subsequently, the liquid polymerization reaction mixture discharged from the first vertical stirring reactor 6a is continuously and successively fed to the second vertical stirring reactor 6b, third vertical stirring reactor 6c, fourth vertical stirring reactor 6d, and fifth horizontal stirring reactor 9a, whereby the polycondensation reaction proceeds. Reaction conditions in each reactor are set so that temperature and the degree of vacuum become higher and the rate of stirring becomes lower as the polycondensation reaction proceeds. During the polycondensation reaction, the liquid level in each reactor is regulated so as to result in an average residence time in the reactor of, for example, about 60 minutes. The by-product phenol is distilled off from the reactors through the distillate tubes 8b, 8c, 8d, and 8e.

In this embodiment, by-products including phenol are continuously liquefied with and recovered through the condensers 81a and 81b, which have been attached respectively to the first vertical stirring reactor 6a and the second vertical stirring reactor 6b. Each of the condensers 81a and 81b may be divided into two or more condensers so that part or all of the distillate condensed in the condenser located nearest to the reactor is refluxed to the first vertical stirring reactor 6a or second vertical stirring reactor 6b. This configuration is preferred because the control of starting material molar ratio is facilitated thereby. Furthermore, cold traps (not shown) have been disposed on the downstream side of the condensers 81c, 81d, and 81e, which have been attached respectively to the third vertical stirring reactor 6c, fourth vertical stirring reactor 6d, and fifth horizontal stirring reactor 9a, to continuously solidify/recover by-products.

(Initiation of Melt Polycondensation in the Continuous Production Apparatus)

In this embodiment, the melt polycondensation of the dihydroxy compounds with a carbonic acid diester, which is based on a transesterification reaction, is initiated according to the following procedure.

First, in the continuous production apparatus shown in FIG. 2, the five reactors connected serially (the first vertical stirring reactor 6a, second vertical stirring reactor 6b, third vertical stirring reactor 6c, fourth vertical stirring reactor 6d, and fifth horizontal stirring reactor 9a) are each set so as to have an internal temperature and a pressure which are suitable for the melt polycondensation based on a transesterification reaction.

Although the internal temperature and pressure of each reactor are not particularly limited, these conditions are usually as follows.
(First vertical stirring reactor 6a)
Internal temperature, 150° C.-250° C.; pressure, ordinary pressure to 13.3 kPa
(Second vertical stirring reactor 6b)
Internal temperature, 180° C.-250° C.; pressure, 70 kPa to 10 kPa
(Third vertical stirring reactor 6c)
Internal temperature, 220° C.-270° C.; pressure, 10 kPa to 0.1 kPa
(Fourth vertical stirring reactor 6d)
Internal temperature, 220° C.-270° C.; pressure, 1,000 Pa to 1 Pa
(Fifth horizontal stirring reactor 9a)
Internal temperature, 220° C.-270° C.; pressure, 500 Pa to 1 Pa Next, the starting-material mixing tank 2a is separately used to mix the dihydroxy compounds and a carbonic acid diester together in a given molar ratio in a nitrogen gas atmosphere to obtain a starting-material molten mixture.

Subsequently, after the internal temperature and pressure of each of the five reactors have reached values within the ranges of from −5% to +5% based on the respective set values, the starting-material molten mixture separately prepared in the starting-material mixing tank 2a is continuously fed to the first vertical stirring reactor 6a. Simultaneously with initiation of the feeding of the starting-material molten mixture, a catalyst begins to be continuously supplied to the first vertical stirring reactor 6a through the catalyst supply opening 5a to initiate the melt polycondensation based on a transesterification reaction.

In the first vertical stirring reactor 6a, in which melt polycondensation is conducted, the liquid level of the liquid polymerization reaction mixture is kept constant so as to result in a given average residence time. Examples of methods for keeping the liquid level within the first vertical stirring reactor 6a constant include a method in which the degree of opening of a valve (not shown) disposed in the vessel bottom part of a polymer discharge line is controlled while detecting the liquid level generally with a level or the like.

In this operation, the average residence time in the first vertical stirring reactor 6a is not particularly limited. However, the average residence time therein is generally from 30 minutes to 120 minutes.

Subsequently, the liquid polymerization reaction mixture is discharged from the bottom of the first vertical stirring reactor 6a and then continuously and successively fed to the second vertical stirring reactor 6b, third vertical stirring reactor 6c, and fourth vertical stirring reactor 6d. In this first-stage polycondensation step, a polycarbonate having a reduced viscosity of preferably 0.03-0.40 dL/g, more preferably 0.05-0.40 dL/g, is obtained.

From the standpoint of the color tone of the polycarbonate to be obtained, it is preferred that the devices constituting the reaction apparatus and constituent parts including the piping should be ones in which the surfaces of the portions which come into contact with a starting-material monomer or with the liquid polymerization mixture (hereinafter referred to as "liquid-contact portions") are constituted of one or more materials selected from stainless steel having a nickel content of 10% by weight or higher, glass, nickel, tantalum, chromium, and Teflon (registered trademark) so that the one or more materials account for at least 90% of the total surface area of the liquid-contact portions. In the invention, the liquid-contact portions are not particularly limited in the materials thereof so long as the surface materials thereof are constituted of any of those substances. A laminate of any of those substances with another substance or a plated material obtained by depositing any of those substances on another substance can be used as the surface materials.

(Second-Stage Polycondensation Reaction Step)

Subsequently, the polycarbonate obtained in the first-stage polycondensation reaction step is fed to a horizontal stirring reactor 9a which has a horizontal rotating shaft and mutually discontinuous stirring blades attached approximately perpendicularly to the horizontal rotating shaft and in which when the length of the horizontal rotating shaft and the rotation diameter of the stirring blades are respectively expressed by L and D, then L/D is 1-15. A polycondensation reaction is conducted therein under temperature/pressure conditions suitable for the second polycondensation reaction, such as those which will be shown later, while the phenol which generates as a by-product and part of the unreacted monomers are being removed from the system through the distillate tube 8e.

This horizontal stirring reactor 9a has one or more horizontal rotating shafts, and stirring blades have been disposed on the horizontal rotating shafts in at least two stages per rotating shaft. The stirring blades are of one kind or a combination of two or more kinds selected from the disk type, wheel type, paddle type, rod type, window frame type, and the like. This reactor 9a is a horizontal high-viscosity-liquid treatment device in which the reaction solution is lifted up or spread with the stirring blades to make the reaction solution undergo surface replacement. In this description, the term "surface replacement of a reaction solution" means the phenomenon in which a liquid-surface portion of the reaction solution is replaced by a portion of the reaction solution which underlies the liquid surface. As described above, the horizontal stirring reactor to be used in the invention is a device including a horizontal shaft and mutually discontinuous stirring blades attached approximately perpendicularly to the horizontal shaft, and has no screw part unlike extruders. In the process (II) of the invention, at least one such horizontal stirring reactor is used.

The reaction temperature in the second-stage polycondensation step is in the range of generally 210-280° C., preferably 220-260° C., and the reaction pressure therein is generally from 13.3 kPa to 1.3 Pa, preferably from 1 kPa to 1.3 Pa, more preferably from 500 Pa to 1 Pa.

Compared to twin-screw vented extruders, the horizontal stirring reactor to be used in the process (II) of the invention has a high tendency to hold up due to the structure of the device. Because of this, reaction conditions (in particular, temperature) can be rendered milder by prolonging the residence time of a reaction mixture. Consequently, a polycarbonate having a further improved color tone and excellent mechanical properties can be obtained.

In this second polycondensation reaction step, a polycarbonate having a reduced viscosity of generally 0.2-1.70 dL/g, preferably 0.35-1.60 dL/g, more preferably 0.45-1.00 dL/g, is obtained.

During the melt polycondensation reaction, the liquid level in each reactor is regulated so as to result in a given average residence time. Although the average residence time in each reactor is not particularly limited, it is generally from 30 minutes to 120 minutes.

Incidentally, the phenol which generates as a by-product simultaneously with the melt polycondensation reaction in each reactor is distilled off from the system through the distillate tube (8a, 8b, 8c, 8d, or 8e) attached to the reactor.

In this embodiment, it is preferred that a starting-material molten mixture and a catalyst should be continuously fed after the internal temperatures and pressures of all reactors in the continuous production apparatus shown in FIG. 2 have reached given values, whereby melt polycondensation based on a transesterification reaction is initiated.

Because of this, the average residence time of the liquid polymerization reaction mixture in each reactor becomes equal to that in stationary operation immediately after initiation of the melt polycondensation. As a result, the liquid polymerization reaction mixture does not undergo an unnecessary heat history and the polycarbonate resin obtained is reduced in the content of crystalline foreign matter and other foreign matter including gel particles or scorched particles. Furthermore, this polycarbonate resin has a satisfactory color tone.

When a polycarbonate is produced by a melt polymerization method in a process of the invention, a phosphoric acid compound, a phosphorous acid compound, or a metal salt of either can be added during the polymerization for the purpose of preventing coloration.

Suitable for use as the phosphoric acid compound is one or more of trialkyl phosphates such as trimethyl phosphate and triethyl phosphate. These compounds may be added in an amount of preferably from 0.0001% by mole to 0.005% by mole, more preferably from 0.0003% by mole to 0.003% by mole, based on all dihydroxy compounds to be subjected to the reaction. In the case where such phosphoric acid compounds are added in an amount smaller than the lower limit, the effect of preventing coloration is low. In the case where the amount thereof is larger than the upper limit, this is causative of an increase in haze or there are even the cases where the phosphoric acid compounds enhance, rather than reduce, coloration or reduce heat resistance.

In the case where a phosphorous acid compound is added, any of the heat stabilizers shown below can be selected at will and used.

In particular, one or more of the following are suitable: trimethyl phosphite, triethyl phosphite, trisnonylphenyl phosphite, trimethyl phosphite, tris(2,4-di-tert-butylphenyl) phosphite, and bis(2,4-di-tert-butylphenyl) pentaerythritol diphosphite.

These phosphorous acid compounds may be added in an amount of preferably from 0.0001% by mole to 0.005% by mole, more preferably from 0.0003% by mole to 0.003% by mole, based on all dihydroxy compounds to be subjected to the reaction. In the case where such phosphorous acid compounds are added in an amount smaller than the lower limit, the effect of preventing coloration is low. In the case where the amount thereof is larger than the upper limit, this is causative of an increase in haze or there are even the cases where the phosphorous acid compounds enhance, rather than reduce, coloration or reduce heat resistance.

Either a phosphoric acid compound and a phosphorous acid compound or metal salts of these can be added in combination. In this case, the amount of these compounds to be added, in terms of the total amount of the phosphoric acid compound and phosphorous acid compound or of the metal salts of these, is preferably from 0.0001% by mole to 0.005% by mole, more preferably from 0.0003% by mole to 0.003% by mole, based on all dihydroxy compounds, as stated above. In the case where those compounds are added in an amount smaller than the lower limit, the effect of preventing coloration is low. In the case where the amount thereof is larger than the upper limit, this is causative of an increase in haze or there are even the cases where those compounds enhance, rather than reduce, coloration or reduce heat resistance.

The metal salts of a phosphoric acid compound and phosphorous acid compound preferably are alkali metal salts and zinc salts thereof. Especially preferred are zinc salts. Preferred of the zinc salts of phosphoric acid are the zinc salts of long-chain alkyl phosphates.

The processes of the invention described above are typical examples of embodiments for obtaining the polycarbonate of the invention, and the polycarbonate of the invention should not be construed as being limited to those obtained by the processes.

There are the cases where the polycarbonate of the invention contains formic acid which generated due to a heat history applied in the polymerization reaction. Formic acid has a low pKa value and corrodes the reaction apparatus, in particular, the venting tubes, condensers, cold traps, vacuum pumps, etc. In addition, when contained in product pellets finally obtained, the formic acid is causative of the corrosion of molds in injection molding or corrosion of cooling rolls and the like in film or sheet forming. It is therefore preferred that the polycarbonate of the invention should have a formic acid content of generally lower than 5 ppm by weight, especially 3 ppm by weight or lower. A product polymer having a reduced formic acid content can be obtained by conducting the polymerization reaction at a lower temperature for a shorter time period and at a higher degree of vacuum. The horizontal reactor used in the processes of the invention can have a large vaporization interface area and improved suitability for surface replacement and, hence, can diminish the formic acid contained in the polymer. Incidentally, the amount of formic acid contained in a polymer can be determined by the method which will be described in Examples.

There are the cases where double bonds formed by a side reaction, probably an intramolecular dehydration reaction, are present at terminals of the polycarbonate of the invention. Especially when a dihydroxy compound represented by general formula (1) was used as one of the monomer ingredients, there are terminals having a double bond which are represented by the following structural formula (A), the terminals being thought to have been formed by dehydration of units of the compound.

[Chem. 19]

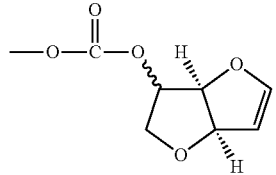

(A)

Such a double bond serves as a site where an undesirable branching reaction occurs or is causative of coloration. It is therefore preferred that the concentration of the terminal double bond in the polycarbonate of the invention should be 10 µeq/g or lower, especially 8 µeq/g or lower, in particular 5 µeq/g or lower. That side reaction can be diminished by conducting the polymerization reaction at a lower temperature and a higher degree of vacuum for a shorter time period. Use of the horizontal reactor is effective in diminishing such terminal double bonds because the reactor can have a large vaporization interface area and improved suitability for surface replacement and enables the polymerization reaction to proceed at a lower temperature in a shorter time period. Incidentally, the concentration of terminal double bonds can be determined by $^1$H-NMR spectroscopy as will be described in Examples.

The concentration of terminal phenyl groups in the polycarbonate of the invention is not particularly limited. However, in the case where a polycarbonate having too low a concentration thereof is to be obtained, the rate of polymerization reaction is reduced, resulting in the necessity of increasing the catalyst amount or applying an unnecessary heat history. In addition, too low concentrations of terminal phenyl groups make the polycarbonate suffer enhanced coloration when held with heating, resulting in quality deterioration especially in molding. It is therefore preferred that the concentration thereof should be generally 30 µeq/g or higher, especially 50 µeq/g or higher, in particular 80 µeq/g or higher. On the other hand, in the case where a polycarbonate having too high a concentration of terminal phenyl groups is to be obtained, the rate of polymerization tends to be reduced in this case also and this may result in an enhanced heat history and impaired polymer quality. Consequently, a suitable concentration thereof is preferably 200 µeq/g or lower, more preferably 150 µeq/g or lower, especially 120 µeq/g or lower.

For controlling the concentration of terminal phenyl groups, it is important not only to precisely regulate a molar ratio between the dihydroxy compounds and carbonic acid diester as starting materials but also to provide initial-stage reaction vessels with a reflux condenser and thereby reduce molar ratio fluctuations occurring with monomer volatilization or to minimize a heat history and thereby inhibit the concentration of terminal phenyl groups from fluctuating due to side reactions. Use of the horizontal reactor is effective in inhibiting the concentration of terminal phenyl groups from fluctuating due to side reactions, because the reactor can have a large vaporization interface area and improved suitability for surface replacement. Incidentally, the concentration of terminal phenyl groups can be determined by $^1$H-NMR spectroscopy as will be described in Examples.

The polycarbonate of the invention contains a slight amount of phenol which generated as a by-product of the polymerization reaction. In the case where product pellets to be finally obtained have a high phenol content, the phenol is causative of an odor during molding or of coloration. Consequently, the phenol content thereof is generally 500 ppm by weight or lower, preferably 300 ppm by weight or lower, more preferably 100 ppm by weight or lower, especially preferably 50 ppm by weight or lower. In batch polymerization reactions, it is difficult to diminish phenol. However, use of the horizontal reactor described in the invention is effective in diminishing residual phenol because this reactor can have a large vaporization interface area and improved suitability for surface replacement. Residual phenol can be diminished also by subjecting the polycarbonate, after completion of the polymerization reaction, to a volatile removal treatment with a single-screw or twin-screw extruder. The content of residual phenol can be determined by liquid chromatography as will be described in Examples.

It is preferred that the viscosity of the polycarbonate of the invention, in terms of reduced viscosity, should be generally 0.20 dL/g or higher, preferably 0.40 dL/g or higher, more preferably 0.42 dL/g or higher, and be generally 2.00 dL/g or lower, preferably 1.60 dL/g or lower, especially preferably 1.00 dL/g or lower. Polycarbonates having an exceedingly low reduced viscosity have poor mechanical strength after having being molded into lenses, etc. Polycarbonates having too high a reduced viscosity tend to have reduced flowability during molding to reduce cycle characteristics, and there is a tendency that the molded article obtained is apt to have an increased birefringence.

The polycarbonate of the invention has an Abbe number of preferably 50 or larger, especially preferably 55 or larger. The larger the value thereof, the smaller the wavelength-dependent dispersion of refractive indexes. For example, when the polycarbonate is used as a single lens, the chromatic aberration thereof decreases with increasing Abbe number, making it easy to obtain clearer images. The smaller the Abbe number, the larger the wavelength-dependent dispersion of refractive indexes. When the polycarbonate is used as a single lens, the chromatic aberration thereof increases with decreasing Abbe number, resulting in enhanced image blurring. Consequently, the larger the value of Abbe number, the more the polycarbonate is preferred. There is no particular upper limit on the Abbe number.

The polycarbonate of the invention has a 5% weight loss temperature of preferably 340° C. or higher, more preferably 345° C. or higher. The higher the 5% weight loss temperature, the higher the thermal stability and the higher the temperature at which the polycarbonate can be used. In addition, the polycarbonate having a high 5% weight loss temperature can be produced at an elevated temperature, and the allowance of control for production can be widened. Such a polycarbonate is therefore easy to produce. The lower the 5% weight loss temperature, the lower the thermal stability and the more the polycarbonate is difficult to use at high temperatures. In addition, the allowance of control for production becomes narrow, making the production difficult. Consequently, there is no particular upper limit on the 5% weight loss temperature. The higher the 5% weight loss temperature, the better. The decomposition temperature of the copolymer is an upper limit.

The polycarbonate of the invention has a photoelastic coefficient which is preferably $-20 \times 10^{-12}$ $Pa^{-1}$ or higher, more preferably $-10 \times 10^{-12}$ $Pa^{-1}$ or higher, and is preferably $40 \times 10^{-12}$ $Pa^{-1}$ or lower, more preferably $20 \times 10^{-12}$ $Pa^{-1}$ or lower. In the case of producing an optical film, for example, a high photoelastic coefficient results in a large value of the phase retardation of the film formed by melt extrusion, solution casting, etc. When this film is stretched, slight changes in tension result in further increased fluctuations in the in-plane phase retardation of the film. Furthermore, when such a retardation film is applied, not only a shifting from the desired phase retardation occurs due to tension for the application, but also the value of phase retardation is apt to change due to the contraction, etc. of the polarizing plate obtained by the application. The lower the photoelastic coefficient, the smaller the fluctuations in phase retardation.

The polycarbonate of the invention has an Izod impact strength of preferably 30 $J/m^2$ or higher. The higher the Izod impact strength thereof, the higher the strength of the molded article and the less the molded article is apt to break. There is hence no particular upper limit.

It is preferred that the polycarbonate of the invention should satisfy the following: the amount of any gas, other than phenol ingredients, which generates per unit area from the polycarbonate at 110° C. (hereinafter sometimes referred to simply as "gas generation amount") is 5 $ng/cm^2$ or smaller. It is more preferred that the gas generation amount regarding gases derived from the dihydroxy compounds other than the dihydroxy compound represented by general formula (1) should be 0.5 $ng/cm^2$ or smaller. The smaller the gas generation amount, the more the polycarbonate is usable in applications where influences of generated gases should be avoided, such as, for example, applications in which electronic parts, e.g., semiconductors, are stored, applications concerning interior materials for buildings, and housings of domestic electrical products, etc.

Specific methods for determining the Abbe number, 5% weight loss temperature, photoelastic coefficient, Izod impact strength, and gas generation amount of the polycarbonate of the invention are as shown in Examples, which will be described later.

When examined by differential scanning calorimetry (DSC), the polycarbonate of the invention shows a single glass transition temperature. By regulating the kinds and proportions of the dihydroxy compound represented by general formula (1) and the alicyclic dihydroxy compound, the glass transition temperature of the polycarbonate can be changed. Thus, the polycarbonate can be obtained as a polymer which has any desired glass transition temperature in the range of, for example, from about 45° C. to about 155° C. according to applications.

For example, for film applications where flexibility is necessary, it is preferred to regulate the glass transition temperature of the polycarbonate to 45° C. or higher, e.g., 45-100° C. For applications as molded articles required to have some degree of heat resistance, such as bottles and packages, it is preferred to regulate the glass transition temperature of the polycarbonate to 90° C. or higher, e.g., 90-130° C. When the polycarbonate has a glass transition temperature of 120° C. or higher, this polycarbonate is suitable for lens applications. Namely, the polycarbonate having such a glass transition temperature is less apt to deform even in a high-temperature high-humidity environment such as, e.g., one having a temperature of 85° C. and a relative humidity of 85%, and is reduced in fluctuations of lens surface accuracy. That glass transition temperature is therefore preferred.

A heat stabilizer can be incorporated into the polycarbonate of the invention for the purpose of preventing the molecular weight or color tone thereof from decreasing or deteriorating during molding, etc.

Examples of the heat stabilizer include phosphorous acid, phosphoric acid, phosphonous acids, phosphonic acids, and esters thereof. Specific examples thereof include triphenyl phosphite, tris(nonylphenyl) phosphite, tris(2,4-di-tert-butylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl) pentaerythritol diphosphite, 2,2-methylenebis(4,6-di-tert-butylphenyl) octyl phosphite, bis(nonylphenyl) pentaerythritol diphosphite, bis(2,4-di-tert-butylphenyl) pentaerythritol diphosphite, distearyl pentaerythritol diphosphite, tributyl phosphate, triethyl phosphate, trimethyl phosphate, triphenyl phosphate, diphenyl mono-o-xenyl phosphate, dibutyl phosphate, dioctyl phosphate, diisopropyl phosphate, tetrakis(2,4-di-tert-butylphenyl) 4,4'-biphenylenediphosphinate, dimethyl benzenephosphonate, diethyl benzenephosphonate, and dipropyl benzenephosphonate. Preferred of these are trisnonylphenyl phosphite, trimethyl phosphate, tris(2,4-di-tert-butylphenyl) phosphite, bis(2,4-di-tert-butylphenyl) pentaerythritol diphosphite, bis(2,6-di-tert-butyl-4-methylphenyl) pentaerythritol diphosphite, and dimethyl benzenephosphonate.

One of these heat stabilizers may be used alone, or two or more thereof may be used in combination.

Such a heat stabilizer may be additionally incorporated in addition to the amount added during the melt polymerization. Namely, after an appropriate amount of a phosphorous acid compound or phosphoric acid compound was added to obtain a polycarbonate, a phosphorous acid compound may be further added by the addition method which will be described later. As a result, the heat stabilizer can be incorporated in a larger amount while preventing a haze increase or coloration from occurring during polymerization and while avoiding a decrease in heat resistance. Consequently, color tone deterioration can be prevented.

The amount of those heat stabilizers to be incorporated is preferably 0.0001-1 part by weight, more preferably 0.0005-0.5 parts by weight, even more preferably 0.001-0.2 parts by weight, per 100 parts by weight of the polycarbonate.

A generally known antioxidant may be incorporated into the polycarbonate of the invention for the purpose of preventing oxidation.

Examples of the antioxidant include one or more of pentaerythritol tetrakis(3-mercaptopropionate), pentaerythritol tetrakis(3-laurylthiopropionate), glycerol 3-stearylthiopropionate, triethylene glycol bis[3-(3-tert-butyl-5-methyl-4-hydroxyphenyl)-propionate], 1,6-hexanediol bis[3-(3,5-di-tert-butyl-4-hydroxyphenyl)propionate], pentaerythritol tetrakis[3-(3,5-di-tert-butyl-4-hydroxyphenyl)propionate], octadecyl 3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxybenzylphosphonate diethyl ester, tris(3,5-di-tert-butyl-4-hydroxybenzyl) isocyanurate, tetrakis(2,4-di-tert-butylphenyl) 4,4'-biphenylenediphosphinate, 3,9-bis{1,1-dimethyl-2-[β-(3-tert-butyl-4-hydroxy-5-methyl-phenyl) propionyloxy]ethyl}-2,4,8,10-tetraoxaspiro(5,5)undecane, and the like.

The amount of those antioxidants to be incorporated is preferably 0.0001-0.5 parts by weight per 100 parts by weight of the polycarbonate.

A release agent can be incorporated into the polycarbonate of the invention in order to further improve mold releasability for melt molding, so long as the incorporation thereof does not defeat the objects of the invention.

Examples of the release agent include higher-fatty-acid esters of mono- or polyhydric alcohols, higher fatty acids, paraffin waxes, beeswax, olefin waxes, olefin waxes containing a carboxy group and/or carboxylic acid anhydride group, silicone oils, and organopolysiloxanes.

The higher-fatty-acid esters preferably are partial or complete esters of a mono- or polyhydric alcohol having 1-20 carbon atoms with a saturated fatty acid having 10-30 carbon atoms. Examples of the partial or complete esters of a mono- or polyhydric alcohol with a saturated fatty acid include stearic acid monoglyceride, stearic acid diglyceride, stearic acid triglyceride, stearic acid monosorbitate, stearyl stearate, behenic acid monoglyceride, behenyl behenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate, and 2-ethylhexyl stearate.

Preferred of these are stearic acid monoglyceride, stearic acid triglyceride, pentaerythritol tetrastearate, and behenyl behenate.

The higher fatty acids preferably are saturated fatty acids having 10-30 carbon atoms. Examples of these fatty acids include myristic acid, lauric acid, palmitic acid, stearic acid, and behenic acid.

One of those release agents may be used alone, or two or more thereof may be used in combination.

The amount of such release agents to be incorporated is preferably 0.01-5 parts by weight per 100 parts by weight of the polycarbonate.

A light stabilizer can be incorporated into the polycarbonate of the invention so long as the incorporation thereof does not defeat the objects of the invention.

Examples of the light stabilizer include 2-(2'-hydroxy-5'-tert-octylphenyl)benzotriazole, 2-(3-tert-butyl-5-methyl-2-hydroxyphenyl)-5-chlorobenzo-triazole, 2-(5-methyl-2-hydroxyphenyl)benzotriazole, 2-[2-hydroxy-3,5-bis(α,α-dimethylbenzyl)phenyl]-2H-benzotriazole, 2,2'-methylenebis(4-cumyl-6-benzotriazole-phenyl), and 2,2'-p-phenylenebis(1,3-benzoxazin-4-one).

One of these light stabilizers may be used alone, or two or more thereof may be used in combination.

The amount of such light stabilizers to be incorporated is preferably 0.01-2 parts by weight per 100 parts by weight of the polycarbonate.

A bluing agent can be incorporated into the polycarbonate of the invention in order to eliminate the yellowness of lenses which is attributable to the polymer or an ultraviolet absorber. Any bluing agent for use in polycarbonate resins can be used without arousing any particular trouble. In general, anthraquinone dyes are easily available and preferred.

Specific examples of the bluing agents include the following typical examples: common name Solvent Violet 13 [CA. No. (color index No.) 60725], common name Solvent Violet 31 [CA. No. 68210], common name Solvent Violet 33 [CA. No. 60725], common name Solvent Blue 94 [CA. No. 61500], common name Solvent Violet 36 [CA. No. 68210], common name Solvent Blue 97 ["Macrolex Violet RR", manufactured by Bayer AG], and common name Solvent Blue 45 [CA. No. 61110].

One of these bluing agents may be used alone, or two or more thereof may be used in combination.

Those bluing agents may be incorporated in a proportion of from $0.1 \times 10^{-4}$ to $2 \times 10^{-4}$ parts by weight per 100 parts by weight of the polycarbonate.

For incorporating various additives such as those described above into the polycarbonate of the invention, use may be made, for example, of: a method in which the ingredients are mixed by means of a tumbling mixer, twin-cylinder mixer, supermixer, Nauta mixer, Banbury mixer, kneading rolls, extruder, or the like; or a solution blending method in which the ingredients are dissolved in a common good solvent such as, e.g., methylene chloride and mixed together in the solution state. However, methods for incorporating additives are not particularly limited, and any of the polymer blending techniques in ordinary use may be employed.

The polycarbonate thus obtained or a polycarbonate composition obtained by incorporating various additives and another resin thereinto can be molded into various molded articles by a generally known technique such as, e.g., injection molding, extrusion molding, or compression molding, either directly or after having been temporarily formed into pellets with a melt extruder. Examples of the molded articles include films, sheets, bottles, and containers; lenses such as camera lenses, finder lenses, and lenses for CCDs and CMOSs; optical films such as retardation films, diffusion sheets, and polarization films for liquid-crystal or plasma displays; and other optical materials or optical parts for optical disks, optical waveguides, etc.

From the standpoint of enhancing the compatibility of the polycarbonate to obtain stable releasability and stable properties, it is preferred to use a single-screw extruder or a twin-screw extruder in the melt extrusion. The technique employing a single-screw extruder or a twin-screw extruder does not necessitate use of a solvent or the like and is reduced in environmental burden. That technique can be advantageously used also from the standpoint of productivity.

Melt kneading temperature for the extruder depends on the glass transition temperature of the polycarbonate. When the glass transition temperature of the polycarbonate is lower than 90° C., the melt kneading temperature for the extruder is generally 130° C.-250° C., preferably 150-240° C. In the case where the melt kneading temperature is lower than 130° C., the polycarbonate melt has an increased viscosity to impose an increased load on the extruder, resulting in reduced productivity. In the case where the temperature is higher than 250° C., the polycarbonate melt has a reduced viscosity to make pellet formation difficult, resulting in reduced productivity.

When the glass transition temperature of the polycarbonate is 90° C. or higher, the melt kneading temperature for the extruder is generally 200-300° C., preferably 220° C.-260° C. In the case where the melt kneading temperature is lower than 200° C., the polycarbonate melt has an increased viscosity to impose an increased load on the extruder, resulting in reduced productivity. In the case where the temperature is higher than 300° C., the polycarbonate is apt to deteriorate. In this case, the polycarbonate yellows or decreases in molecular weight to thereby have impaired strength.

In the case where an extruder is used, it is desirable to dispose a filter in order to prevent polycarbonate scorching and foreign-matter inclusion during extrusion. The size of foreign matter particles capable of being removed by the filter (opening size) is preferably 100 μm or smaller, although the size depends on desired optical accuracy. Especially when it is important to avoid inclusion of foreign matter, the opening size is 40 μm or smaller, preferably 20 μm or smaller. When foreign matter should be further avoided, the opening size is preferably 10 μm or smaller.

It is desirable that extrusion of the polycarbonate should be conducted in a clean room in order to prevent inclusion of foreign matter after the extrusion.

When the polycarbonate extruded is cooled and formed into chips, it is preferred to use a method in which the extrudate is cooled with air, water, etc. It is desirable that air from which foreign matter has been removed beforehand with a high-efficiency particulate air filter or the like should be used for the air cooling in order to prevent the foreign matter present in air from adhering again. In the case of employing water cooling, it is desirable to use water from which metallic ingredients have been removed with, e.g., an ion-exchange resin and foreign matter has been further removed with a filter. Although filters of various sizes (opening sizes) are usable, it is preferred to use a filter having an opening size of from 10-0.45 μm.

The steps of volatile removal and kneading with an extruder may be continuously performed according to need using the extruder connected to the horizontal stirring reactor.

For molding the polycarbonate of the invention into a lens, an injection molding machine or an injection-compression molding machine is suitable. Especially important among conditions for this molding are mold surface temperature and resin temperature. Such molding conditions vary depending on the composition and molecular weight of the polycarbonate, etc., and cannot be unconditionally specified. However, the mold surface temperature is preferably from 30° C. to 170° C., and the resin temperature in this case is preferably regulated to 220° C. to 290° C. In the case where the mold surface temperature is lower than 30° C., the resin is poor in both flowability and transferability and there is a tendency that a stress strain remains after the injection molding, resulting in enhanced birefringence. In the case where the mold surface temperature is higher than 170° C., the resin is apt to deform upon release from the mold although transferability thereof is satisfactory. In the case where the resin temperature is higher than 290° C., the resin is susceptible to decomposition and this is causative of reduced strength and coloration of the molded article. In addition, such too high resin temperatures are not economical because a prolonged molding cycle results.

In the case where an optical material or an optical part is molded from the polycarbonate of the invention, it is desired that care should be taken not to allow dust particles and the like to come into, in steps including a starting-material charging step, a polymerization step, and a step in which the copolymer obtained is extruded in a cooling medium and formed into pellets, a sheet, or a film. The degree of cleanness is usually class 6, in terms of the degree of cleanness as provided for in JIS-B9920, in the case where the polycarbonate is for use in compact disks, and is class 5 or lower in the case where the polycarbonate is for use in more sophisticated information recording.

The polycarbonate of the invention is especially suitable for use as optical films including film/sheet members represented by ones for liquid-crystal displays, such as retardation films, films for widening viewing angle, polarizer protection films, prism sheets, diffusion sheets, reflection sheets, and films for preventing surface reflection, and release films, protective films, and the like for use in production steps.

The polycarbonate of the invention can be used also as a binder for fixing sheets, optical disks, optical materials, optical parts, dyes, charge transfer agents, etc.

The polycarbonate of the invention can be used also as a polymer alloy obtained by kneading the polycarbonate together with, for example, one or more of synthetic resins such as aromatic polycarbonates, aromatic polyesters, aliphatic polyesters, polyamides, polystyrene, polyolefins, acrylics, amorphous polyolefins, ABSs, and ASs, biodegradable resins such as poly(lactic acid) and poly(butylene succinate), and rubbers. These polymer alloys can be used also as compositions of the copolymer according to the invention.

EXAMPLES

The invention will be explained below in more detail by reference to Examples. However, the invention should not be construed as being limited by the following Examples unless the invention departs from the spirit thereof.

In the following, properties of isosorbide and polycarbonates were evaluated by the following methods.

(1) Refractive Index and Abbe Number

An Abbe refractometer ("DR-M4", manufactured by Atago Co., Ltd.) and interference filters for wavelengths of 656 nm (C-line), 589 nm (D-line), 546 nm (e-line), and 486 nm (F-line) were used to measure refractive indexes nC, nD, ne, and nF at the respective wavelengths.

A test sample was obtained by press-molding a resin at 160-200° C. to produce a film having a thickness of from 80 μm to 500 μm and strips having a width of about 8 mm and a length of from 10 to 40 mm were cut out of the film to obtain specimens.

A measurement was made at 20° C. using 1-bromonaphthalene as an interfacial liquid.

Abbe number νd was calculated using the following equation.

$$\nu d=(1-nD)/(nC-nF)$$

The larger the Abbe number, the smaller the wavelength dependence of refractive index and the smaller the wavelength-dependent focal shifting, for example, in a single lens.

(2) Glass Transition Temperature (Tig)

About 10 mg of a sample was examined with a differential scanning calorimeter ("DSC822", manufactured by Mettler Inc.) while being heated at a heating rate of 10° C./min. In accordance with JIS-K7121 (1987), the lower-temperature-side base line was extended toward the higher-temperature side to draw a straight line, and a tangent was drawn to the point which was located in a stepwise changing section attributable to glass transition and at which the curve had a maximum gradient. The temperature corresponding to the point of intersection of the straight line and the tangent was determined as an extrapolated glass transition initiation temperature.

(3) Color

A color meter ("300A", manufactured by Nippon Denshoku Kogyo K.K.) was used to determine the color of chips.

A given amount of chips were placed in a glass cell and examined through a reflectance measurement to determine a value of b.

The smaller the value thereof, the lower the yellowness.

(4) Reduced Viscosity

A Ubbelohde viscometer was used in automatic viscometer Type DT-504, manufactured by Chuo Rika Corp. A 1/1 by weight mixture of phenol and 1,1,2,2-tetrachloroethane was used as a solvent to measure the viscosity at a temperature of 30.0° C.±0.1° C. A solution was precisely prepared so as to have a concentration of 1.00 g/dL.

A sample was dissolved with stirring at 120° C. for 30 minutes, and the resultant solution was subjected to the measurement after cooling.

Relative viscosity ηrel was determined from the flow time for the solvent t0 and the flow time for the solution t using the following equation.

$$\eta rel = t/t0$$

Specific viscosity ηsp was determined from the relative viscosity ηrel using the following equation.

$$\eta sp = (\eta-\eta 0)/\eta 0 = \eta rel - 1$$

The specific viscosity ηsp was divided by the concentration c (g/dL) to determine the reduced viscosity ηred using the following equation.

$$\eta red = \eta sp/c$$

The larger the value thereof, the higher the molecular weight.

(5) 5% Weight Loss Temperature

"TG-DTA" (SSC-5200, TG/DTA220), manufactured by Seiko Instruments & Electronics Ltd., was used. Ten milligrams of a sample was placed in an aluminum vessel and examined in a nitrogen atmosphere (nitrogen flow rate, 200 mL/min) while elevating the temperature from 30° C. to 450° C. at a heating rate of 10° C./min. The temperature at which the weight had decreased by 5% was determined.

The higher the temperature, the less the polymer is susceptible to pyrolysis.

(6) Izod Impact Strength

Injection molding machine Mini Max "CS-183MMX", manufactured by Custom Scientific Inc., was used to injection-mold test pieces having a length of 31.5 mm, width of 6.2 mm, and thickness of 3.2 mm, at a temperature of 240-300° C. A notch having a depth of 1.2 mm was formed therein with a notching machine to obtain specimens.

The specimens were examined with Izod impact tester Mini Max "Type CS-183TI", manufactured by Custom Scientific Inc., to determined a notched Izod impact strength at 23° C.

The larger the value thereof, the higher the impact strength and the less the molded article is apt to break.

(7) Tensile Test

Tensile test pieces having a parallel-part length of 9 mm and a parallel-part diameter of 1.5 mm were injection-molded with the injection molding machine at a temperature of 240° C. to 300° C. Tensile tester "Type CS-183TE", manufactured by Custom Scientific Inc., was used to conduct a tensile test under the conditions of a pulling rate of 1 cm/min to determine an elongation at yield, tensile strength at yield, tensile modulus at yield, and elongation at break.

The larger the value of each property, the higher the strength or elongation.

(8) Determination of Terminal Phenyl Groups and Isosorbide-Derived Terminated Double Bonds $^1$H-NMR spectroscopy was conducted to determine the contents of the groups and bonds in the following manner.

Sample Preparation

A 25-30 mg portion of a polymer was weighed out and dissolved in 0.7 mL of heavy chloroform at room temperature. The heavy chloroform used was taken out of one containing a silver foil as a stabilizer.

Measurement Conditions

The resultant solution was packed into an NMR tube having an outer diameter of 5 mm, and examined with an NMR apparatus manufactured by Bruker GmbH (AVANCE 400) under the conditions of 400 MHz, 45° pulse, irradiation time of 4 seconds, standby time of 6 seconds, and number of integrations of 256.

Method of Analysis

The integral of a signal appearing at 4.70 ppm to 4.46 ppm which was assigned to the main chain of isosorbide was taken as 100. Subsequently, the integral of a signal appearing at 2.70 ppm to 0.50 ppm which was assigned to the main chain of tricyclodecanedimethanol (TCDDM) was determined. This value is referred to as integral (1). A correction was made with respect to the integral for water, which overlapped that region.

The integral of a signal appearing at 7.44 ppm to 7.34 ppm which is assigned to phenyl ends is determined and referred to as integral (2). The integral of a signal appearing at 6.63 ppm to 6.60 ppm which is assigned to double bonds of the structure formed by dehydration of isosorbide ends is determined and referred to as integral (3).

From those integrals, the concentration of terminal phenyl groups and the amount of isosorbide-derived terminal double bonds were calculated using the following equations.

Concentration of terminal phenyl groups={(integral (2))/2)/[100×(formula weight of isosorbide main-chain unit)+(integral (1))/14×(formula weight of TCDDM main-chain unit)+(integral (2))/2×(formula weight of phenyl end unit)+(integral (3))× (formula weight of isosorbide-derived double-bond end unit)]}×10$^6$ (unit: μeq/g)

Concentration of isosorbide-derived terminal double-bond groups={(integral (3))/[100×(formula weight of isosorbide main-chain unit)+(integral (1))/14×(formula weight of TCDDM main-chain unit)+(integral (2))/2×(formula weight of phenyl end unit)+(integral (3))×(formula weight of isosorbide-derived double-bond end unit)]}×10$^6$ (unit: μeq/g)

Incidentally, the formula weights of the units used for calculating the terminal group concentrations are as follows.

Formula weight of isosorbide main-chain unit=172.14
Formula weight of TCDDM main-chain unit=222.28
Formula weight of phenyl end unit=93.10
Formula weight of isosorbide-derived double-bond end unit=155.13

(9) Photoelastic Coefficient

<Sample Production>

A 4.0 g portion of a polycarbonate resin sample which had been vacuum-dried at 80° C. for 5 hours was pressed for 1 minute with a hot press at a hot-press temperature of 200-250° C. under the conditions of a preheating period of 1-3 minutes and a pressure of 20 MPa using a spacer having a width of 8 cm, length of 8 cm, and thickness of 0.5 mm. Thereafter, the resin was taken out together with the spacer and pressed/cooled with a water-pipe-cooled press at a pressure of 20 MPa for 3 minutes to produce a sheet. A sample having a width of 5 mm and a length of 20 mm was cut out of the sheet.

<Measurement>

The sample was examined using an apparatus configured by combining a birefringence analyzer including a He—Ne laser, polarizer, compensator, analyzer, and light detector with a vibration-type viscoelastometer (DVE-3, manufactured by Rheology Co., Ltd.). (For details, refer to *Journal of the Society of Rheology, Japan*, Vol. 19, pp. 93-97 (1991).)

The sample cut out was fixed to the viscoelastometer and examined for storage modulus E' at room temperature of 25° C. and a frequency of 96 Hz. Simultaneously therewith, the laser light emitted was passed through the polarizer, sample, compensator, and analyzer in this order and picked up with the light detector (photodiode), and the signals were passed through a lock-in amplifier. With respect to waveform at an angular frequency of ω or 2ω, the amplitude and the phase difference caused by the strain were determined to determine a strain-optical coefficient O'. For this operation, the direction of the polarizer and that of the analyzer were regulated so as to be perpendicular to each other and each form an angle of π/4 with the stretching direction of the sample.

A photoelastic coefficient C was determined from the storage modulus E' and the strain-optical coefficient O' using the following equation.

$$C=O'/E'$$

(10) Pencil Hardness

Surface measuring device "TRIBOGEAR Type 14DR", manufactured by Shinto Scientific Co., Ltd., was used as a measuring apparatus, and a measurement was made in accordance with JIS-K5600 under the following conditions.

Load: 750 g
Measuring speed: 30 mm/min
Measuring distance: 7 mm

As pencils, use was made of UNI, manufactured by Mitsubishi Pencil Co., Ltd.

The pencils used had hardnesses of 4H, 3H, 2H, H, F, HB, B, 2B, 3B, and 4B.

A specimen was tested five times, and the hardness softer by one rank than the hardness of the pencil which marred the specimen two or more times was taken as the pencil hardness of the specimen.

(11) Determination of Formic Acid Contained in Isosorbide

The amount of formic acid contained in isosorbide was determined by ion chromatography in the following manner. About 0.5 g of isosorbide was precisely weighed out and placed in a 50-mL measuring flask, and pure water was added thereto to adjust the volume of the resultant solution. An aqueous solution of sodium formate was used as a reference. The peak having the same retention time as the peak of the reference was regarded as assignable to formic acid, and the amount of formic acid was determined from the area of the peak by the absolute calibration curve method.

The apparatus used was Type DX-500, manufactured by Dionex Corp., and a conductometric detector was used as a detector. As measuring columns, use was made of AG-15 and AS-15, both manufactured by Dionex Corp., as a guard column and a separation column, respectively. A test sample was injected into a 100-4 sample loop, and 10-mM NaOH was used as an eluent to examine the sample at a flow rate of 1.2 mL/min and a thermostatic-chamber temperature of 35° C. As a suppressor was used a membrane suppressor. As a regenerant solution was used a 12.5-mM aqueous solution of $H_2SO_4$.

(12) Determination of Formic Acid Contained in Polycarbonate

One gram of a sample was precisely weighed out and then dissolved in 10 mL of chloroform. Thereto was added 20 mL of pure water. The resultant mixture was sufficiently stirred. The aqueous phase obtained was examined by ion chromatography in the same manner as in (11) above to determine the content of formic acid.

(13) Determination of Phenol Contained in Polycarbonate

In 7 mL of methylene chloride was dissolved 1.25 g of a sample. Acetone was added thereto so as to result in a total amount of 25 mL to conduct a reprecipitation treatment. The solution was filtered through a 0.2-μm disk filter and examined by liquid chromatography to determine the amount of phenol. Thereafter, the residual amount was calculated.

The apparatus and conditions used are as follows.

Apparatus: The following apparatus manufactured by Shimadzu Corp.

System controller CBM-20A
Pump LC-10AT
Column oven CTO-10Avp
Detector SPD-10Avp
Analysis column: SUPELCO Ascentis Express C18 (5 cm×3.0 mm; particle size, 2.7 μm)
Oven temperature: 40° C.

Detector: UV 213 nm
Eluent:

A) 0.1% aqueous phosphoric acid solution/acetonitrile=5/1
B) acetonitrile
(gradient proportions of liquid B from 3% to 95%)

Sample injection amount: 3 μL

The isosorbide used for reaction was one manufactured by Roquette Freres; cesium carbonate by Wako Pure Chemical Industries Ltd.; diphenyl carbonate by Mitsubishi Chemical Corp.; and tricyclodecanedimethanol by OXEA GmbH.

The isosorbide used in the Examples was one which had a formic acid content reduced to 5 ppm or lower by distillation. The method of isosorbide distillation used in the Examples is as follows.

<Distillation of Isosorbide>

Five hundred parts by weight of isosorbide (ISOB; melting point, 66° C.) containing disodium hydrogen phosphate as a stabilizer in an amount of 30 ppm by weight was introduced beforehand in a nitrogen stream into a vessel equipped with a stirrer and was heated with a heat medium. At the time when the isosorbide had begun to melt and became capable of being stirred, stirring was initiated. The whole isosorbide was evenly melted, and the internal temperature was regulated to 80° C. Subsequently, the pressure of the vessel was gradually reduced, and the contents were heated. At the time when the internal pressure was reduced to 133-266 Pa and the internal temperature reached 160° C., a distillate began to be discharged. An initial distillate was obtained in an amount of 25.5 parts by weight. Thereafter, 403.5 parts by weight of a main distillate and 28.5 parts by weight of a succeeding distillate were obtained, and the remainder was left as a bottoms in the vessel. After completion of the distillation, nitrogen was introduced to return the internal pressure to ordinary pressure. The distilled product obtained was cooled in a nitrogen stream and then pulverized to obtain distillation-purified isosorbide. This isosorbide was stored in a sealed aluminum laminate bag together with Ageless (manufactured by Mitsubishi Gas Chemical Co., Ltd.) enclosed therein, at room temperature in a nitrogen stream.

Example 1

As shown in FIG. 1, which was described hereinabove, a polycarbonate was produced with the continuous production apparatus including four vertical stirring reactors and one horizontal stirring reactor under the following conditions.

First, as shown below, the reactors and preheaters each were set beforehand so as to have the internal temperature and pressure shown in Table 1 according to the reaction conditions. In Table 1, "Temperature difference" means the difference between the polymer temperature in each polymerizer and the temperature of the heating medium being supplied to the polymerizer.

Next, in a separate starting-material preparation step, the isosorbide (ISOB) purified by distillation as described above, tricyclodecanedimethanol (TCDDM), and diphenyl carbonate (DPC) were mixed together in a given molar ratio (DPC/ISOB/TCDDM=1.03/0.7/0.3) and heated to 140° C., in a nitrogen gas atmosphere. Thus, a starting-material molten mixture was obtained.

Subsequently, this starting-material molten mixture was continuously fed, through a starting-material introduction pipe heated to 140° C., to the first vertical stirring reactor 6a regulated so as to have a temperature and a process which were within the ±5% ranges based on the given values. The liquid level was kept constant by regulating the degree of opening of the valve (not shown) disposed in the vessel bottom part of the polymer discharge line, so as to result in an average residence time of 60 minutes.

Furthermore, simultaneously with initiation of the feeding of the starting-material molten mixture, an aqueous cesium carbonate solution as a catalyst began to be continuously supplied through the catalyst supply opening 5a to the first vertical stirring reactor 6a in a proportion of 1.0 µmol per mole of all dihydroxy ingredients.

A liquid polymerization reaction mixture (reduced viscosity, 0.01 dL/g) discharged from the bottom of the first vertical stirring reactor 6a was subsequently fed continuously and successively to the second vertical stirring reactor 6b (reduced viscosity, 0.13 dL/g), third vertical stirring reactor 6c (reduced viscosity, 0.20 dL/g), fourth vertical stirring reactor 6d (reduced viscosity, 0.25 dL/g), and fifth horizontal stirring reactor 9a (spectacle-shaped blade; L/D=4).

During the polymerization reaction, the liquid levels were regulated so as to result in an average residence time in each reactor of 60 minutes, and the phenol which generated as a by-product simultaneously with the polymerization reaction was distilled off.

The polycarbonate thus obtained through the fifth horizontal stirring reactor had a reduced viscosity of 0.56, a glass transition temperature (Tig) of 129° C., a color b value of 6.5, a formic acid content lower than 2 ppm by weight, a terminal phenyl group concentration of 82 µeq/g, an isosorbide-derived terminal double-bond content of 4.0 µeq/g (referred to "Terminal double bond" in Table 1), a phenol content of 70 ppm by weight, and a 5% weight loss temperature of 348° C. These results are summarized in Table 1. The polycarbonate further had a photoelastic coefficient of $9 \times 10^{-12}$ $Pa^{-1}$ and a pencil hardness of F. Furthermore, a film having a thickness of about 200 µm formed by pressing the polycarbonate copolymer at 200° C. had a d-line refractive index of 1.5095 and an Abbe number of 62.

Example 2

Polymerization reaction was conducted in the same manner as in Example 1, except that the conditions for the first vertical stirring reactor 6a, fourth vertical stirring reactor 6d, and fifth horizontal stirring reactor 9e were changed as shown in Table 1. The polycarbonate obtained had a reduced viscosity of 0.56, a glass transition temperature (Tig) of 129° C., a color b value of 5.0, a formic acid content lower than 2 ppm by weight, a terminal phenyl group concentration of 95 µeq/g, an isosorbide-derived terminal double-bond content of 3.0 µeq/g, a phenol content of 50 ppm by weight, and a 5% weight loss temperature of 350° C. These results are summarized in Table 1. The polycarbonate further had the same values of photoelastic coefficient, d-line refractive index, and Abbe number as in Example 1.

Example 3

Polymerization reaction was conducted in the same manner as in Example 1, except that the preheater 11a was not used and the conditions for the first vertical stirring reactor 6a, fourth vertical stirring reactor 6d, and fifth horizontal stirring reactor 9e were changed as shown in Table 1. The polycarbonate obtained had a reduced viscosity of 0.56, a glass transition temperature (Tig) of 129° C., a color b value of 6.7, a formic acid content of 4 ppm by weight, a terminal phenyl group concentration of 45 µeq/g, an isosorbide-derived terminal double-bond content of 8.5 µeq/g, a phenol content of 72 ppm by weight, and a 5% weight loss temperature of 345° C. These results are summarized in Table 1. The polycarbonate further had the same values of photoelastic coefficient, d-line refractive index, and Abbe number as in Example 1.

Comparative Example 1

Polymerization reaction was conducted in the same manner as in Example 1, except that the preheaters 11a, 11b, 11c, 11d, and 11e were not used and the reaction conditions were changed as shown in Table 1.

The polycarbonate thus obtained through the fifth horizontal stirring reactor had a reduced viscosity of 0.56, a glass transition temperature (Tig) of 129° C., a color b value of 7.3, a formic acid content of 5 ppm by weight, a terminal phenyl group concentration of 22 µeq/g, an isosorbide-derived terminal double-bond content of 11.0 µeq/g, a phenol content of 75 ppm by weight, and a 5% weight loss temperature of 342° C. These results are summarized in Table 1.

Comparative Example 2

Polymerization reaction was conducted in the same manner as in Example 1, except that the preheaters 11d and 11e were not used and the conditions for the fourth vertical stirring reactor 6d and fifth horizontal stirring reactor 9e were changed as shown in Table 1. The polycarbonate obtained had a reduced viscosity of 0.55, a glass transition temperature (Tig) of 129° C., a color b value of 10.5, a formic acid content of 8 ppm by weight, a terminal phenyl group concentration of 25 μeq/g, an isosorbide-derived terminal double-bond content of 15.0 μeq/g, a phenol content of 150 ppm by weight, and a 5% weight loss temperature of 338° C. These results are summarized in Table 1.

First, the reactors each were set beforehand so as to have the internal temperature and pressure shown in Table 2 according to the reaction conditions.

TABLE 2

|  | Pressure | Temperature |
| --- | --- | --- |
| First vertical stirring reactor 6a | ordinary pressure | 180° C. |
| Second vertical stirring reactor 6b | 13.3 kPa | 210° C. |
| Third vertical stirring reactor 6c | 2 kPa | 220° C. |
| Fourth vertical stirring reactor 6d | 67 Pa | 230° C. |
| Fifth horizontal stirring reactor 9a | 67 Pa | 230° C. |

Next, in a separate starting-material preparation step, the isosorbide (ISOB) purified by distillation as described above, tricyclodecanedimethanol (TCDDM), and diphenyl carbonate (DPC) were mixed together in a given molar ratio (DPC/ISOB/TCDDM=1.03/0.7/0.3) and heated to 140° C., in a nitrogen gas atmosphere. Thus, a starting-material molten mixture was obtained.

Subsequently, this starting-material molten mixture was continuously fed, through a starting-material introduction

TABLE 1

|  |  | Unit | Ex. 1 | Ex. 2 | Ex. 3 | Comp. Ex. 1 | Comp. Ex. 2 |
| --- | --- | --- | --- | --- | --- | --- | --- |
|  | Preheater 11a outlet temperature | ° C. | 180 | 180 | — | — | 180 |
| First vertical stirring reactor 6a | Internal temperature | ° C. | 210 | 200 | 170 | 210 | 210 |
|  | Heating medium temperature | ° C. | 270 | 240 | 210 | 310 | 270 |
|  | Temperature difference | ° C. | 60 | 40 | 40 | 100 | 60 |
|  | Pressure | MPa | 0.101 | 0.101 | 0.101 | 0.101 | 0.101 |
|  | Average residence time | min | 60 | 70 | 70 | 60 | 60 |
|  | Reduced viscosity | dL/g | 0.01 | 0.01 | <0.01 | 0.01 | 0.01 |
|  | Preheater 11b outlet temperature | ° C. | 210 | 210 | 210 | — | 210 |
| Second vertical stirring reactor 6b | Internal temperature | ° C. | 210 | 210 | 210 | 210 | 210 |
|  | Heating medium temperature | ° C. | 240 | 240 | 240 | 275 | 240 |
|  | Temperature difference | ° C. | 30 | 30 | 30 | 65 | 30 |
|  | Pressure | kPa | 13.3 | 13.3 | 13.3 | 13.3 | 13.3 |
|  | Average residence time | min | 60 | 60 | 60 | 60 | 60 |
|  | Reduced viscosity | dL/g | 0.13 | 0.13 | 0.08 | 0.13 | 0.13 |
|  | Preheater 11c outlet temperature | ° C. | 215 | 215 | 215 | — | 215 |
| Third vertical stirring reactor 6c | Internal temperature | ° C. | 220 | 220 | 220 | 220 | 220 |
|  | Heating medium temperature | ° C. | 240 | 240 | 240 | 250 | 240 |
|  | Temperature difference | ° C. | 20 | 20 | 20 | 30 | 20 |
|  | Pressure | kPa | 2.0 | 2.0 | 2.0 | 2.0 | 2.0 |
|  | Average residence time | min | 60 | 60 | 60 | 60 | 60 |
|  | Reduced viscosity | dL/g | 0.20 | 0.20 | 0.16 | 0.20 | 0.20 |
|  | Preheater 11d outlet temperature | ° C. | 225 | 225 | 225 | — | — |
| Fourth vertical stirring reactor 6d | Internal temperature | ° C. | 230 | 225 | 225 | 230 | 250 |
|  | Heating medium temperature | ° C. | 240 | 235 | 235 | 240 | 315 |
|  | Temperature difference | ° C. | 10 | 10 | 10 | 10 | 65 |
|  | Pressure | Pa | 133 | 133 | 133 | 133 | 133 |
|  | Average residence time | min | 60 | 70 | 90 | 60 | 30 |
|  | Reduced viscosity | dL/g | 0.25 | 0.25 | 0.21 | 0.25 | 0.24 |
|  | Preheater 11e outlet temperature | ° C. | 230 | 230 | 230 | — | — |
| Fifth horizontal stirring reactor 9e | Internal temperature | ° C. | 230 | 230 | 230 | 230 | 245 |
|  | Heating medium temperature | ° C. | 240 | 235 | 240 | 240 | 290 |
|  | Temperature difference | ° C. | 10 | 5 | 10 | 10 | 45 |
|  | Pressure | Pa | 133 | 133 | 133 | 133 | 133 |
|  | Average residence time | min | 60 | 70 | 150 | 60 | 30 |
| Polymer | Reduced viscosity | dL/g | 0.56 | 0.56 | 0.56 | 0.56 | 0.55 |
|  | Tig | ° C. | 129 | 129 | 129 | 129 | 129 |
|  | Color b value | — | 6.5 | 5.0 | 6.7 | 7.3 | 10.5 |
|  | Formic acid content | weight ppm | <2 | <2 | 4 | 5 | 8 |
|  | Terminal phenyl group | μeq/g | 82 | 95 | 45 | 22 | 25 |
|  | Terminal double bond | μeq/g | 4.0 | 3.0 | 8.5 | 11.0 | 15.0 |
|  | Phenol content | weight ppm | 70 | 50 | 72 | 75 | 150 |
|  | Weight loss temperature | ° C. | 348 | 350 | 345 | 342 | 338 |

Example 4

As shown in FIG. 2, which was described hereinabove, a polycarbonate was produced with the continuous production apparatus including four vertical stirring reactors and one horizontal stirring reactor under the following conditions.

pipe heated to 140° C., to the first vertical stirring reactor 6a regulated so as to have a temperature and a process which were within the ±5% ranges based on the given values. The liquid level was kept constant by regulating the degree of opening of the valve (not shown) disposed in the vessel bottom part of the polymer discharge line, so as to result in an average residence time of 60 minutes.

Furthermore, simultaneously with initiation of the feeding of the starting-material molten mixture, an aqueous cesium carbonate solution as a catalyst began to be continuously supplied through the catalyst supply opening 5a to the first vertical stirring reactor 6a in a proportion of 1.0 μmol per mole of all dihydroxy ingredients.

A liquid polymerization reaction mixture discharged from the bottom of the first vertical stirring reactor 6a was subsequently fed continuously and successively to the second vertical stirring reactor 6b, third vertical stirring reactor 6c, fourth vertical stirring reactor 6d (reduced viscosity, 0.25 dL/g), and fifth horizontal stirring reactor 9a (spectacle-shaped blade; L/D=4).

During the polymerization reaction, the liquid levels were regulated so as to result in an average residence time in the first vertical stirring reactor 6a and second vertical stirring reactor 6b of 60 minutes and in an average residence time in the fourth vertical stirring reactor 6d and fifth horizontal stirring reactor 9a of 45 minutes. Furthermore, the phenol which generated as a by-product simultaneously with the polymerization reaction was distilled off during the reaction.

The polycarbonate thus obtained through the fifth horizontal stirring reactor had a reduced viscosity of 0.60, a glass transition temperature (Tig) of 129° C., a color b value of 5.5, a formic acid content lower than 2 ppm by weight, a terminal phenyl group concentration of 90 μeq/g, an isosorbide-derived terminal double-bond content of 2.5 μeq/g, a phenol content of 40 ppm by weight, and a 5% weight loss temperature of 350° C. The polycarbonate further had a photoelastic coefficient of $9 \times 10^{-12}$ $Pa^{-1}$ and a pencil hardness of F. Furthermore, a film having a thickness of about 200 μm formed by pressing the polycarbonate copolymer at 200° C. had a d-line refractive index of 1.5095 and an Abbe number of 62.

Comparative Example 3

A polycarbonate was produced using a batch polymerization apparatus including two vertical reaction vessels. Into a starting-material preparation tank were introduced 26.6 parts by weight of isosorbide (ISOB), 15.3 parts by weight of tricyclodecanedimethanol (TCDDM), and 58.0 parts by weight of diphenyl carbonate (DPC) at an internal tank temperature of 100° C. or lower. The internal pressure was repeatedly increased and reduced in a nitrogen atmosphere to perform replacement with nitrogen. The temperature of the heat medium heating the starting-material preparation tank was regulated to 240° C.-250° C.

Thereafter, the internal tank temperature was regulated to 150° C., and the starting materials were melted with stirring (about 60 minutes). After the melting, the starting-material mixture was transferred to a reaction vessel having a jacket heat-medium temperature of 240° C. Thereafter, $1.06 \times 10^{-4}$ parts by weight ($1.34 \times 10^{-3}$ mol) of cesium carbonate (prepared as a 0.2% aqueous solution) was introduced as a catalyst into the reaction vessel to initiate polymerization reaction. Subsequently, the pressure was reduced from ordinary pressure to 13.3 kPa over 60 minutes and kept at 13.3 kPa thereafter. Simultaneously with initiation of the pressure reduction, the internal temperature of the reaction vessel began to be elevated from 150° C. to 220° C. over 90 minutes, during which the phenol which generated was withdrawn from the reaction vessel. After the temperature and pressure had reached 220° C. and 13.3 kPa, the contents were held for 120 minutes. The resultant prepolymer had a reduced viscosity of 0.15 dL/g.

In the second step, the temperature of the other reaction vessel was elevated to 230° C. over 30 minutes. Simultaneously therewith, the internal pressure of the reaction vessel was reduced to 0.200 kPa or lower over 60 minutes to distill off the phenol which generated. In this operation, the temperature of the heat medium heating the reaction vessel was regulated to 245-255° C. After a given stirring torque had been reached (at about 4 hours after initiation of the second step), the reaction was terminated and the reaction product yielded was extruded in water to obtain pellets.

The polycarbonate thus obtained had a reduced viscosity of 0.60, a glass transition temperature (Tig) of 129° C., a color b value of 12.5, a formic acid content of 10 ppm by weight, a terminal phenyl group concentration of 30 μeq/g, an isosorbide-derived terminal double-bond content of 15.5 μeq/g, a phenol content of 970 ppm by weight, and a 5% weight loss temperature of 337° C.

While the invention has been described in detail and with reference to specific embodiments thereof, it will be apparent to one skilled in the art that various changes and modifications can be made therein without departing from the spirit and scope thereof.

This application is based on a Japanese patent application filed on Dec. 13, 2007 (Application No. 2007-322490) and a Japanese patent application filed on Dec. 13, 2007 (Application No. 2007-322491), the entire contents thereof being herein incorporated by reference.

Industrial Applicability

The polycarbonate of the invention is suitable for use in the field of films or sheets where flexibility is required, in the field of bottles or containers where heat resistance is necessary, as various structural materials required to have impact strength, in lens applications such as camera lenses, finder lenses, and lenses for CCDs or CMOSs, and in other applications including films or sheets for use in liquid-crystal or plasma displays, such as retardation films, diffusion sheets, and polarizing films, and binders for fixing optical disks, films, sheets, optical materials, optical parts, dyes or charge transfer agents, etc.

The invention claimed is:

1. A process for producing a polycarbonate, comprising subjecting one or more dihydroxy compounds comprising a dihydroxy compound having at least one linking group —$CH_2$—O— in a molecule thereof to melt polycondensation with a carbonic acid diester in at least two serially arranged reactors to produce a polycarbonate, wherein, in the reactors, a difference between a temperature of a polymer and a temperature of a heating medium is regulated to 80° C. or smaller when the polycarbonate yielded has a reduced viscosity of 0.10 dL/g or lower, or to 60° C. or smaller when the polycarbonate yielded has a reduced viscosity exceeding 0.10 dL/g but not higher than 0.40 dL/g, or to 40° C. or smaller when the polycarbonate yielded has a reduced viscosity exceeding 0.40 dL/g.

2. The process according to claim 1, wherein in a first-stage reactor, the difference between the polymer temperature and the temperature of the heating medium is regulated to 80° C. or smaller when the polycarbonate yielded has a reduced viscosity of 0.10 dL/g or lower, or to 60° C. or smaller when the polycarbonate yielded has a reduced viscosity exceeding 0.10 dL/g but not higher than 0.40 dL/g, or to 40° C. or smaller when the polycarbonate yielded has a reduced viscosity exceeding 0.40 dL/g.

3. The process according to claim 1, wherein in a final-stage reactor, the difference between the polymer temperature and the temperature of the heating medium is regulated to 60° C. or smaller when the polycarbonate yielded has a reduced viscosity of 0.30 dL/g or lower, or to 50° C. or smaller when the polycarbonate yielded has a reduced viscosity exceeding 0.30 dL/g but not higher than 0.40 dL/g, or to 40° C. or smaller when the polycarbonate yielded has a reduced viscosity exceeding 0.40 dL/g.

4. A process for producing a polycarbonate by subjecting one or more dihydroxy compounds comprising a dihydroxy compound having at least one linking group —CH₂—O— in a molecule thereof to melt polycondensation with a carbonic acid diester by heating with a heating medium, comprising
carrying out a first-stage polycondensation, wherein a mixture of the dihydroxy compounds and the carbonic acid diester is fed in a molten state to a vertical reactor equipped with a vertical rotating shaft and a stirring blade attached to the vertical rotating shaft, and a polycondensation reaction is conducted at a temperature of 150° C. to 270° C. to obtain a polycarbonate having a reduced viscosity of 0.03-0.40 dL/g and
carrying out a second-stage polycondensation, wherein the polycarbonate obtained in the first-stage polycondensation is fed to a horizontal stirring reactor which has a horizontal rotating shaft and mutually discontinuous stirring blades attached approximately perpendicularly to the horizontal rotating shaft and wherein when a length of the horizontal rotating shaft and a rotation diameter of the stirring blades are respectively expressed by L and D, then L/D is in a range of from 1 to 15, and a polycondensation reaction is conducted at a temperature of 210° C. to 270° C. to obtain a polycarbonate having a reduced viscosity of from 0.20 to 1.70 dL/g.

5. The process according to claim 4, wherein the dihydroxy compounds further comprise at least one dihydroxy compound selected from the group consisting of alicyclic dihydroxy compounds, aliphatic dihydroxy compounds, oxyalkylene glycols, aromatic dihydroxy compounds, and diols having a cyclic ether structure.

6. The process for polycarbonate according to claim 1, wherein the dihydroxy compound having at least one linking group —CH₂—O— in the molecule thereof comprises a dihydroxy compound represented by the following general formula (1):

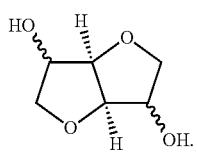

(1)

7. The process according to claim 6, wherein the proportion of the dihydroxy compound represented by general formula (1) to all dihydroxy compounds is 10% by mole or higher.

8. The process according to claim 1, wherein the heating medium has a temperature of 270° C. or lower.

9. A polycarbonate produced by a process comprising subjecting one or more dihydroxy compounds comprising a dihydroxy compound having at least one linking group —CH₂—O— in a molecule thereof to melt polycondensation with a carbonic acid diester, and by having a reduced viscosity of from 0.40 dL/g to 1.70 dL/g and a formic acid content lower than 5 ppm by weight.

10. The polycarbonate according to claim 9, having a concentration of terminal phenyl groups of 30 μeq/g or higher.

11. The polycarbonate according to claim 9 having a phenol content of 500 ppm by weight or lower.

12. The polycarbonate according to claim 9, wherein the dihydroxy compound having at least one linking group —CH₂—O— in the molecule thereof comprises a dihydroxy compound represented by the following general formula (1):

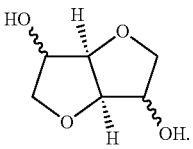

(1)

13. The polycarbonate according to claim 12, wherein a content of a terminal double bond represented by the following structural formula (A) is 10 μeq/g or lower:

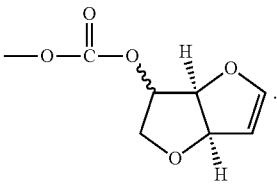

(A)

14. A polycarbonate produced by the process according to claim 1.

15. The polycarbonate according to claim 14, having a reduced viscosity of from 0.40 dL/g to 1.70 dL/g and a formic acid content lower than 5 ppm by weight.

16. The polycarbonate according to claim 14, having a concentration of terminal phenyl groups of 30 μeq/g or higher.

17. The polycarbonate according to claim 14, having a phenol content of 500 ppm by weight or lower.

18. The polycarbonate according to claim 14, comprising a structure obtained from a dihydroxy compound represented by the following general formula (1):

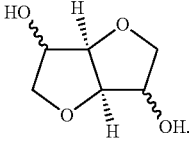

(1)

19. The polycarbonate according to claim 18, wherein a content of a terminal double bond represented by the following structural formula (A) is 10 μeq/g or lower:

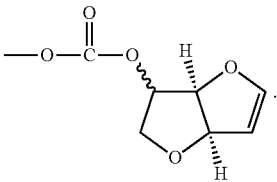

(A)

20. A molded article comprising the polycarbonate according to claim 9 or a composition of the polycarbonate.

21. The polycarbonate according to claim 10, having a phenol content of 500 ppm by weight or lower.

22. The process for polycarbonate according to claim 4, wherein the dihydroxy compound having at least one linking group —CH₂—O— in the molecule thereof comprises a dihydroxy compound represented by the following general formula (1):

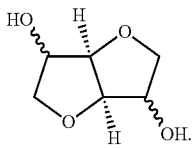

(1)

23. The process according to claim 22, wherein the proportion of the dihydroxy compound represented by general formula (1) to all dihydroxy compounds is 10% by mole or higher.

24. The process according to claim 4, wherein the heating medium has a temperature of 270° C. or lower.

25. The polycarbonate according to claim 10, wherein the dihydroxy compound having at least one linking group —CH₂—O— in the molecule thereof comprises a dihydroxy compound represented by the following general formula (1):

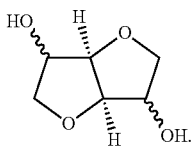

(1)

26. The polycarbonate according to claim 11, wherein the dihydroxy compound having at least one linking group —CH₂—O— in the molecule thereof comprises a dihydroxy compound represented by the following general formula (1):

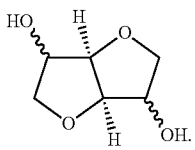

(1)

27. The polycarbonate according to claim 21, wherein the dihydroxy compound having at least one linking group —CH₂—O— in the molecule thereof comprises a dihydroxy compound represented by the following general formula (1):

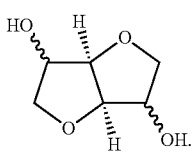

(1)

28. The polycarbonate according to claim 25, wherein a content of a terminal double bond represented by the following structural formula (A) is 10μeq/g or lower:

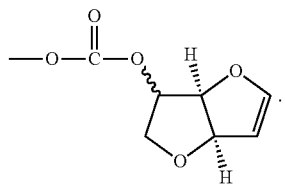

(A)

29. The polycarbonate according to claim 26, wherein a content of a terminal double bond represented by the following structural formula (A) is 10 μeq/g or lower:

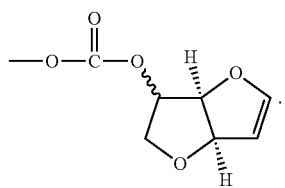

(A)

30. The polycarbonate according to claim 27, wherein a content of a terminal double bond represented by the following structural formula (A) is 10 μeq/g or lower:

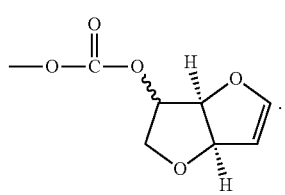

(A)

31. A polycarbonate obtained by the process according to claim 4.

32. The polycarbonate according to claim 31, having a reduced viscosity of from 0.40 dL/g to 1.70 dL/g and a formic acid content lower than 5 ppm by weight.

33. The polycarbonate according to claim 32, having a concentration of terminal phenyl groups of 30 μeq/g or higher.

34. The polycarbonate according to claim 33, having a phenol content of 500 ppm by weight or lower.

35. The polycarbonate according to claim 34, comprising a structure obtained from a dihydroxy compound represented by the following general formula (1):

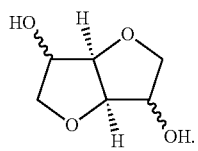

(1)

36. The polycarbonate according to claim 35, wherein a content of a terminal double bond represented by the following structural formula (A) is 10 μq/g or lower:
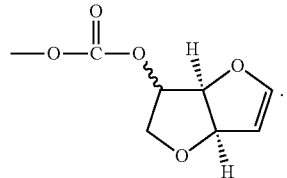
(A)
* * * * *